United States Patent
Deng et al.

(10) Patent No.: US 10,033,470 B2
(45) Date of Patent: Jul. 24, 2018

(54) ACOUSTIC TRANSMISSION DEVICES AND PROCESS FOR MAKING AND USING SAME

(71) Applicants: Battelle Memorial Institute, Richland, WA (US); Army Corps of Engineers, Alexandria, VA (US)

(72) Inventors: Z. Daniel Deng, Richland, WA (US); Mitchell J. Myjak, Richland, WA (US); Thomas J. Carlson, Holmes Beach, FL (US); Jie Xiao, Richland, WA (US); Huidong Li, Richland, WA (US); Samuel S. Cartmell, Richland, WA (US); Jun Lu, Richland, WA (US); Honghao Chen, Ningbo (CN); M. Bradford Eppard, Portland, OR (US); Mark E. Gross, Pasco, WA (US)

(73) Assignees: Battelle Memorial Institute, Richland, WA (US); Army Corps of Engineers, Alexandria, VA (US)

( * ) Notice: Subject to any disclaimer, the term of this patent is extended or adjusted under 35 U.S.C. 154(b) by 0 days.

(21) Appl. No.: 14/914,974

(22) PCT Filed: Aug. 29, 2014

(86) PCT No.: PCT/US2014/053578
§ 371 (c)(1),
(2) Date: Feb. 26, 2016

(87) PCT Pub. No.: WO2015/031853
PCT Pub. Date: Mar. 5, 2015

(65) Prior Publication Data
US 2016/0211924 A1 Jul. 21, 2016

Related U.S. Application Data

(63) Continuation-in-part of application No. 14/014,035, filed on Aug. 29, 2013.

(51) Int. Cl.
*H04R 17/00* (2006.01)
*H04B 11/00* (2006.01)
(Continued)

(52) U.S. Cl.
CPC ............ *H04B 11/00* (2013.01); *A01K 11/006* (2013.01); *A01K 61/90* (2017.01); *G01S 1/725* (2013.01); *G08C 23/02* (2013.01); *H01M 10/052* (2013.01)

(58) Field of Classification Search
USPC ......................................................... 367/134
See application file for complete search history.

(56) References Cited

U.S. PATENT DOCUMENTS 3,100,866 A  8/1963  Marks
3,262,093 A  7/1966  Junger et al.
(Continued)

OTHER PUBLICATIONS

WO PCT/US2014/053578 Inv. Pay Fee, dated Dec. 5, 2014, Battelle Memorial Institute.
(Continued)

*Primary Examiner* — Isam A Alsomiri
*Assistant Examiner* — Jonathan D Armstrong
(74) *Attorney, Agent, or Firm* — Wells St. John P.S.

(57) ABSTRACT

Acoustic tags and a process for fabrication are disclosed for identifying and tracking various hosts including inanimate and animate objects in up to three dimensions. The acoustic tags may be powered by a single power source. Tags can have an operation lifetime of up to 90 days or longer at a transmission rate of 3 seconds. The acoustic tags have an enhanced signal range that enhances detection probability when tracking the hosts.

38 Claims, 14 Drawing Sheets

(51) Int. Cl.
*G08C 23/02* (2006.01)
*A01K 11/00* (2006.01)
*G01S 1/72* (2006.01)
*A01K 61/90* (2017.01)
*H01M 10/052* (2010.01)

(56) References Cited

U.S. PATENT DOCUMENTS

| | | | |
|---|---|---|---|
| 3,311,830 | A | 3/1967 | Skirvin |
| 3,576,732 | A | 4/1971 | Weidinger et al. |
| 3,713,086 | A | 1/1973 | Trott |
| 4,042,845 | A | 8/1977 | Hackett |
| 4,241,535 | A | 12/1980 | Tsukuda |
| 4,259,415 | A | 3/1981 | Tamura et al. |
| 4,353,004 | A | 10/1982 | Kleinschmidt |
| 4,762,427 | A | 8/1988 | Hori et al. |
| 4,986,276 | A | 1/1991 | Wright |
| 5,177,891 | A | 1/1993 | Holt |
| 5,211,129 | A | 5/1993 | Taylor et al. |
| 5,344,357 | A | 9/1994 | Lyczek |
| 5,517,465 | A | 5/1996 | Nestier et al. |
| 5,675,555 | A | 10/1997 | Evans et al. |
| 5,697,384 | A | 12/1997 | Miyawaki et al. |
| 5,974,304 | A | 10/1999 | Chen |
| 5,995,451 | A | 11/1999 | Evans et al. |
| 6,201,766 | B1 | 3/2001 | Carlson et al. |
| 6,662,742 | B2 | 12/2003 | Shelton et al. |
| 6,712,772 | B2 * | 3/2004 | Cohen ............... A61B 5/0215 600/485 |
| 7,016,260 | B2 | 3/2006 | Baray |
| 7,289,931 | B2 | 10/2007 | Ebert |
| 7,457,720 | B2 | 11/2008 | Ebert |
| 8,032,429 | B2 | 10/2011 | Shafer |
| 8,033,890 | B2 | 10/2011 | Warner et al. |
| 8,564,985 | B2 | 10/2013 | van Straaten |
| 9,266,591 | B2 | 2/2016 | Lu |
| 2003/0117893 | A1 | 6/2003 | Baray |
| 2003/0128847 | A1 | 7/2003 | Smith |
| 2006/0218374 | A1 | 9/2006 | Ebert |
| 2007/0088194 | A1 | 4/2007 | Tahar et al. |
| 2007/0103314 | A1 | 5/2007 | Geissler |
| 2007/0288160 | A1 | 12/2007 | Ebert |
| 2009/0073802 | A1 | 3/2009 | Nizzola et al. |
| 2009/0079368 | A1 | 3/2009 | Poppen et al. |
| 2009/0188320 | A1 | 7/2009 | Greenough et al. |
| 2011/0105829 | A1 | 5/2011 | Ball |
| 2011/0163857 | A1 | 7/2011 | August et al. |
| 2011/0181399 | A1 | 7/2011 | Pollack et al. |
| 2011/0254529 | A1 | 10/2011 | van Straaten |
| 2012/0134239 | A1 | 5/2012 | Struthers |
| 2012/0277550 | A1 | 11/2012 | Rosenkranz et al. |
| 2013/0012865 | A1 | 1/2013 | Sallberg et al. |
| 2013/0181839 | A1 | 7/2013 | Cao |
| 2013/0324059 | A1 | 12/2013 | Lee et al. |
| 2014/0211594 | A1 | 7/2014 | Allen et al. |
| 2015/0063072 | A1 | 3/2015 | Deng et al. |
| 2015/0241566 | A1 | 8/2015 | Chakraborty et al. |
| 2015/0289479 | A1 | 10/2015 | Allen et al. |
| 2016/0245894 | A1 | 8/2016 | Deng et al. |
| 2017/0089878 | A1 | 3/2017 | Deng et al. |
| 2017/0164581 | A1 | 6/2017 | Deng et al. |
| 2017/0170850 | A1 | 6/2017 | Deng et al. |
| 2018/0055007 | A1 | 3/2018 | Deng et al. |

OTHER PUBLICATIONS

WO PCT/US2014/053578 IPRP, dated Mar. 1, 2016, Battelle Memorial Institute.
WO PCT/US2014/053578 Search Rept., dated Mar. 5, 2016, Battelle Memorial Institute.
WO PCT/US2014/053578 Writ. Opin., dated Mar. 5, 2016, Battelle Memorial Institute.
Aktakka et al., "Energy Scavenging from Insect Flight", Journal of Micromechanics and Microengineering vol. 21, 095016, 2011, United Kingdom, 10 pages.
Brown et al., "An Evaluation of the Maximum Tag Burden for Implantation of Acoustic Transmitters in Juvenile Chinook Salmon", North American Journal of Fisheries Management vol. 30, 2010, United States, pp. 499-505.
Cha et al., "Energy Harvesting from a Piezoelectric Biomimetic Fish Tail", Renewable Energy vol. 86, 2016, Netherlands, pp. 449-458.
Cha et al., "Energy Harvesting from the Tail Beating of a Carangiform Swimmer using Ionic Polymer-Metal Composites", Bioinspiration and Biomimetics vol. 8, 2013, United Kingdom, 15 pages.
Cook et al., "A Comparison of Implantation Methods for Large PIT Tags or Injectable Acoustic Transmitters in Juvenile Chinook Salmon", Fisheries Research vol. 154, 2014, Netherlands, pp. 213-223.
Dagdeviren et al., "Conformal Piezoelectric Energy Harvesting and Storage from Motions of the Heart, Lung, and Diaphragm ", Proceedings of the National Academy of Sciences of the United States of America vol. 111, 2014, United States, pp. 1927-1932.
Deng et al., "A Cabled Acoustic Telemetry System for Detecting and Tracking Juvenile Salmon: Part 2. Three-Dimensional Tracking and Passage Outcomes", Sensors vol. 11, 2011, Switzerland, pp. 5661-5676.
Deng et al., "An Injectable Acoustic Transmitter for Juvenile Salmon", Scientific Reports, Jan. 29, 2015, United Kingdom, 6 pages.
Deng et al., "Design and Instrumentation of a Measurement and Calibration System for an Acoustic Telemetry System", Sensors vol. 10, 2010, Switzerland, pp. 3090-3099.
Deng et al., U.S. Appl. No. 15/087,936, filed Mar. 31, 2016, titled "Signal Transmitter and Methods for Transmitting Signals from Animals", 59 pages.
Deng et al., U.S. Appl. No. 15/088,032, filed Mar. 31, 2016, titled "Transmitters for Animals and Methods for Transmitting from Animals", 57 pages.
Deng et al., U.S. Appl. No. 62/267,738, filed Dec. 15, 2015, titled "Transmitters for Animals and Methods for Transmitting from Animals", 42 pages.
Deng et al., U.S. Appl. No. 62/267,797, filed Dec. 15, 2015, titled "Signal Transmitter and Methods for Transmitting Signals from Animals", 34 pages.
Eppard, "Juvenile Salmon Acoustic Telemetry System JSATS", Dec. 14, 2011, URL: http://www.nwcouncil.org/media/23478/jsats.pdf, pp. 1-13
Erturk et al., "Underwater Thrust and Power Generation Using Flexible Piezoelectric Composites: An Experimental Investigation Toward Self-Powered Swimmer-Sensor Platforms", Smart Materials and Structures vol. 20, 125013, 2011, United Kingdom, 11 pages.
Hwang et al., "Self-Powered Cardiac Pacemaker Enabled by Flexible Single Crystalline PMN-PT Piezoelectric Energy Harvester", Advanced Materials vol. 26, 2014, Germany, pp. 4880-4887.
Hwang et al.. "Self-Powered Deep Brain Stimulation via a Flexible PIMNT Energy Harvester", Energy and Environmental Science vol. 8, 2015, United Kingdom, pp. 2677-2684.
Lam et al., "Physical Characteristics and Rate Performance of $(CFx)n$ ($0.33<x<9,66$) in Lithium Batteries", Journal of Power Sources vol. 153, 2006, Netherlands, pp. 354-359.
Li et al., "Design Parameters of a Miniaturized Piezoelectric Underwater Acoustic Transmitter", Sensors vol. 12, 2012, Switzerland, pp. 9098-9109.
Li et al., "Energy Harvesting from Low Frequency Applications using Piezoelectric Materials", Applied Physics Reviews 1, 041301, 2014, United States, 20 pages.
Li et al., "Piezoelectric Materials Used in Underwater Acoustic Transducers" Sensor Letters vol. 10 (3/4), 2012, United States, pp. 679-697.
Li et al., "Piezoelectric Transducer Design for a Miniaturized Injectable Acoustic Transmitter", Smart Materials and Structures vol. 24, 115010, 2015, United Kingdom, 9 pages.

(56) References Cited

OTHER PUBLICATIONS

McMichael et al, "The Juvenile Salmon Acoustic Telemetry System: A New Tool", Fisheries vol. 35, No. 1, Jan. 1, 2010, United States, pp. 9-22.
Meduri et al., "Hybrid CVx-Ag2V4O11 as a High-Energy, Power Density Cathode for Application in an Underwater Acoustic Microtransmitter", Electrochemistry Communications vol. 13, 2011, United States, pp. 1344-1348.
Ritchie et al., "Further Developments of Lithium/Polycarbon Monofluoride Envelope Cells", Journal of Power Sources vol. 96, 2001, Netherlands, pp. 180-183.
Rub et al., "Comparative Performance of Acoustic-Tagged and Passive Integrated Transponder-Tagged Juvenile Salmonids in the Columbia and Snake Rivers", U.S. Army Corps of Engineers, Portland District, Portland Oregon, 2007, United States, 163 pages.
S.M. Corporation, "Macro Fiber Composite—MFC" Smart Material Brochure, United States, 8 pages.
Shafer, "Energy Harvesting and Wildlife Monitoring", available online at http://www.ofwim.org/wp-content/uploads/2014/11/Shafer_keynote.pdf, 2014, 36 pages.
Weiland et al., "A Cabled Acoustic Telemetry System for Detecting and Tracking Juvenile Salmon: Part 1, Engineering Design and Instrumentation", Sensors vol. 11, No. 12, Dec. 26, 2011, Switzerland, pp. 5645-5660.
Yazami et al., "Fluorinated Carbon Nanofibres for High Energy and High Power Densities Primary Lithium Batteries", Electrochemistry Communications vol. 9, 2007, United States, pp. 1850-1855.
Zhang et al., "Enhancement of Discharge Performance of Li/CFx by Thermal Treatment of CFx Cathode Material", Journal of Power Sources vol. 188, 2009, Netherlands, pp. 601-605.
Deng et al., U.S. Appl. No. 14/871,761, filed Sep. 30, 2015, titled "Autonomous Sensor Fish to Support Advanced Hydropower Development", 41 pages.
GB 1195633A, Summary, Full Ref, dated Jun. 17, 1970, Varta AG.
WO 2011/068825, Aug. 9, 2011, Eaglepicher Technologies, LLC.
Brown, "Design Considerations for Piezoelectric Polymer Ultrasound Transducers", IEEE Transactions on Ultrasonics, Ferroelectrics, and Frequency Control vol. 47, No. 6, Nov. 2000, United States, pp. 1377-1396.
Brown, "The Effects of Material Selection for Backing and Wear Protection/Quarter-Wave Matching of Piezoelectric Polymer Ultrasound Transducers", IEEE Ultrasonics Symposium, 2000, United States, pp. 1029-1032.
Cada, "The Development of Advanced Hydroelectric Turbines to Improve Fish Passage Survival", Fisheries vol. 26, No. 9, Sep. 2001, United States, pp. 14-23.
Carlson et al., "Sensor Fish Characterization of Spillway Conditions at Ice Harbor Dam in 2004, 2005 and 2006", PNWD-3839 Final Report, Mar. 2008, United States, 95 pages.
Carlson et al., "The Sensor Fish—Making Dams More Salmon-Friendly", Sensors Online, Jul. 2004, United States, 7 pages.
Coutant, "Fish Behavior in Relation to Passage Through Hydropower Turbines: A Review", Transactions of the American Fisheries Society vol. 129, 2000, United States, pp. 351-380.
Deng et al., "Design and Implementation of a New Autonomous Sensor Fish to Support Advanced Hydropower Development", Review of Scientific Instruments vol. 85, 2014, United States, 6 pages.
Deng et al., "Evaluation of Fish-Injury Mechanisms During Exposure to Turbulent Shear Flow", Canadian Journal of Fisheries and Aquatic Sciences vol. 62, 2005, Canada, pp. 1513-1522.
Deng et al., "Six-Degree-of-Freedom Sensor Fish Design and Instrumentation", Sensors vol. 7, 2007, United States, pp. 3399-3415.
Deng et al., "Use of an Autonomous Sensor to Evaluate the Biological Performance of the Advanced Turbine at Wanapum Dam", Journal of Renewable and Sustainable Energy vol. 2, 2010, United States, 11 pages.
Johnson et al., "A Digital Acoustic Recording Tag for Measuring the Response of Wild Marine Mammals to Sound", IEEE Journal of Oceanic Engineering vol. 28, No. 1, Jan. 2003, United States, pp. 3-12.
Kogan et al., "Acoustic Concentration of Particles in Piezoelectric Tubes: Theoretical Modeling of the Effect of Cavity Shape and Symmetry Breaking", The Journal of the Acoustical Society of America vol. 116, No. 4, 2004, United States, pp. 1967-1974.
Odeh, "A Summary of Environmentally Friendly Turbine Design Concepts", DOE/ID/13741 Paper, Jul. 1999, United States, 47 pages.
Richmond et al., "Response Relationships Between Juvenile Salmon and an Autonomous Sensor in Turbulent Flow", Fisheries Research vol. 97, 2009, Netherlands, pp. 134-139.
Carlson et al., "Juvenile Salmon Acoustic Telemetry System Transmitter Downsize Assessment", Pacific Northwest National Laboratory, Richland, WA, 2010, United States, 30 pages.
El Rifai et al., "Modeling of Piezoelectric Tube Actuators", Dspace@MIT: Innovation in Manufacturing Systems and Technology (IMST), 2004, Singapore, 9 pages.
Pacific Northwest National Laboratory, "JSATS Tag Downsize Project Progress Report", PNNL, Apr. 26, 2010, United States, 16 pages.
Pacific Northwest National Laboratory, "Juvenile Salmon Acoustic Telemetry System (JSATS) Acoustic Transmitters", PNNL, Mar. 2010, United States, 1 page.
EP 2037396A1 Full Ref., Mar. 18, 2009, Datamars SA.
GB 2188028A Full Ref., Sep. 23, 1987, Hugh O'Brien.
WO PCT/US2016/054981 Search Rept., dated Nov. 18, 2016, Battelle Memorial Inc.
WO PCT/US2016/054981 Writ. Opin., dated Nov. 18, 2016, Battelle Memorial Inc.
WO PCT/US2016/055045 Search Rept., dated Feb. 7, 2017, Battelle Memorial Inc.
WO PCT/US2016/055045 Writ. Opin., dated Feb. 7, 2017, Battelle Memorial Inc.
WO 2011/079338 Full Ref., Jul. 7, 2011, SmaXtec Animal Care Sales Gr.
WO 2015/031853 Full Ref., Mar. 5, 2015, Battelle Memorial Inc.
Butler et al., "A Tri-Modal Directional Modem Transducer", Oceans 2003 MTS/IEEE Conference, Sep. 22-26, 2003, United States, pp. 1554-1560.
Lewandowski et al., "In Vivo Demonstration of a Self-Sustaining, Implantable, Stimulated-Muscle-Powered Piezoelectric Generator Prototype", Annals of Biomedical Engineering vol. 37, No. 11, Nov. 2009, Netherlands, pp. 2390-2401.
Platt et al., "The Use of Piezoelectric Ceramics for Electric Power Generation Within Orthopedic Implants", IEEE/ASME Transactions on Mechatronics vol. 10, No. 4, Aug. 2005, United States, pp. 455-461.
Rifai et al., "Modeling of Piezoelectric Tube Actuators", Dspace@MIT, available online at https://dspace.mit.edu/bitstream/handle/1721.1/3911/IMST014,pdf, 2004, 8 pages.
Dillon, "Use and Calibration of the Internal Temperature Indicator", Microchip Technology Inc. AN1333, 2010, United States, 12 pages.
CN 102568463 Abst/Full Ref, Jul. 11, 2012, 715th Res Inst Shipbld Ind Corp.
CN 102598716 Abst/Full Ref, Jul. 18, 2012, Vibrant Med EL Hearing Tech G.
CN 102754249 Abst/Full Ref, Oct. 24, 2012, Eaglepicher Technologies, LLC.
CN 1424592 Abst/Full Ref, Jun. 18, 2003, Institut Francais du Petrole.
CN 2014800479315 Search Rept., dated Jul. 26, 2017, Battelle Memorial Institute.
CN 202414143 Abst/Full Ref, Sep. 5, 2012, 715th Res Inst Shipbld Ind Corp.
EP 1705500B1 Full Ref., Jun. 16, 2010, SAP AG.
WO PCT/US2015/062200 IPRP, Aug. 29, 2017, Battelle Memorial Institute.
WO PCT/US2015/062200 Search Rept., dated Feb. 24, 2016, Battelle Memorial Institute.

(56) References Cited

OTHER PUBLICATIONS

WO PCT/US2015/062200 Writ. Opin., dated Feb. 24, 2016, Battelle Memorial Institute.
Biopack Systems, Inc. Hardware Guide, 2013, 152 pages.
Dinwoodie, "Dual Output Boost Converter", Texas Instruments Application Report SLUA288, available online at http://www.ti.com/lit/an/slua288/slua288.pdf, Apr. 2003, 9 pages.
Gallego-Juarez et al., "Experimental Study of Nonlinearity in Free Progressive Acoustic Waves in Air at 20 kHz", Journal de Physique, Colloques, 40 (C8), 1979, France, pp. 336-340.
Li et al., "Piezoelectric Materials used in Underwater Acoustic Transmitters", Sensor Letters vol. 10, 2012, United States, 65 pages.
CA 2,091,043 Full Reference, Sep. 5, 1994, Guigne et al.
WO PCT/US2017/038082 Inv Pay Fees, dated Sep. 15, 2017, Battelle Memorial Institute.
WO PCT/US2017/038082 Search Rept., dated Nov. 20, 2017, Battelle Memorial Institute.
WO PCT/US2017/038082 Writ. Opin., dated Nov. 20, 2017, Battelle Memorial Institute.
WO 95/03691 Full Reference, Feb. 9, 1995, Torronen.
Adams et al., "Effects of Surgically and Gastrically Implanted Radio Transmitters on Swimming Performance and Predator Avoidance of Juvenile Chinook Salmon (*Oncorhynchus tshawytscha*)", Canadian Journal of Fisheries and Aquatic Sciences 55, 1998, Canada, pp. 781-787.
Anglea et al., "Effects of Acoustic Transmitters on Swimming Performance and Predator Avoidance of Juvenile Chinook Salmon", North American Journal of Fisheries Management 24, 2004, United States, pp. 162-170.
Atlantic States Marine Fisheries Commission, "American Eel Benchmark Stock Assessment Report No. Dec. 1", May 2012, United States, 340 pages.
Barns, "Differences in Performance of Naturally and Artificially Propagated Sockeye Salmon Migrant Fry, as Measured With Swimming and Predation Tests", Journal of the Fisheries Board of Canada 24(5), 1967, Canada, pp. 1117-1153.
Barbin et al., "Behaviour and Swimming Performance of Elvers of the American Eel, *Anguilla rostrata*, in an Experimental Flume", Journal of Fish Biology 45, 1994, United Kingdom, pp. 111-121.
Boubee et al., "Downstream Passage of Silver Eels at a Small Hydroelectric Facility", Fisheries Management and Ecology vol. 13, 2006, United Kingdom, pp. 165-176.
Brett, "The Respiratory Metabolism and Swimming Performance of Young Sockeye Salmon", Journal of the Fisheries Board of Canada 21(5), 1964, Canada, pp. 1183-1226.
Brown et al., "Evidence to Challenge the "2% Rule" for Biotelemetry", North American Journal of Fisheries Management 19, 1999, United States, pp. 867-871.
Brown et al., "Survival of Seaward-Migrating PIT and Acoustic-Tagged Juvenile Chinook Salmon in the Snake and Columbia Rivers: An Evaluation of Length-Specific Tagging Effects", Animal Biotelemetry 1:8, 2013, United States, 13 pages.
Collins et al., "Intracoelomic Acoustic Tagging of Juvenile Sockeye Salmon: Swimming Performance, Survival, and Postsurgical Wound Healing in Freshwater and during a Transition to Seawater", Transactions of the American Fisheries Society 142, 2013, United States, pp. 515-523.
Cote et al., "Swimming Performance and Growth Rates of Juvenile Atlantic Cod Intraperitoneally Implanted with Dummy Acoustic Transmitters", North American Journal of Fisheries Management vol. 19, 1999, United States, pp. 1137-1141.
Counihan et al., "Influence of Externally Attached Transmitters on the Swimming Performance of Juvenile White Sturgeon", Transactions of the American Fisheries Society 128, 1999, United States, pp. 965-970.

Deng et al., U.S. Appl. No. 15/393,617, filed Dec. 29, 2016, titled "Systems and Methods for Monitoring Organisms Within an Aquatic Environment", 49 pages.
Fisheries and Oceans Canada (DFO), "Recovery Potential Assessment of American Eel (*Anguilla rostrata*) in Eastern Canada", Canadian Science Advisory Secretariat Science Advisory Report 2013/078, 2013, Canada, 65 pages.
Hamish et al., "A Review of Polymer-Based Water Conditioners for Reduction of Handling-Related Injury", Reviews in Fish Biology and Fisheries 21, 2011, Netherlands, pp. 43-49.
Janak et al., "The Effects of Neutrally Buoyant, Externally Attached Transmitters on Swimming Performance and Predator Avoidance of Juvenile Chinook Salmon", Transactions of the American Fisheries Society 141, 2012, United States, pp. 1424-1432.
MacGregor et al., "Recovery Strategy for the American Eel (*Anguilla rostrata*) in Ontario", Ontario Recovery Strategy Series, Prepared for Ontario Ministry of Natural Resources, Peterborough, Ontario, 2013, Canada, 131 pages.
McGrath et al., "Studies of Upstream Migrant American Eels at the Moses-Saunders Power Dam on the St. Lawrence River near Massena, New York", American Fisheries Society Symposium 33, 2003, United States, pp. 153-166.
Mesa et al., "Survival and Growth of Juvenile Pacific Lampreys Tagged with Passive Integrated Transponders (PIT) in Freshwater and Seawater", Transactions of the American Fisheries Society 141, 2012, United States, pp. 1260-1268.
Mueller et al., "Tagging Juvenile Pacific Lamprey with Passive Integrated Transponders: Methodology, Short-Term Mortality, and Influence on Swimming Performance", North American Journal of Fisheries Management vol. 26, 2006, United States, pp. 361-366.
Normandeau, "Survey for Upstream American Eel Passage at Holyoke Dam, Connecticut River, Massachusetts, 2006", Prepared for Holyoke Gas and Electric by Normandeau Associates, Inc., Apr. 26, 2007, United States, 68 pages.
Økland et al., "Recommendations on Size and Position of Surgically and Gastrically Implanted Electronic Tags in European Silver Eel", Animal Biotelemetry 1:6, 2013, United Kingdom, pp. 1-5.
Panther et al., "Influence of Incision Location on Transmitter Loss, Healing, Survival, Growth, and Suture Retention of Juvenile Chinook Salmon", Transactions of the American Fisheries Society 140, 2011, United States, pp. 1492-1503.
Summerfelt et al., "Anesthesia, Surgery, and Related Techniques", In Schreck, C.B., Moyle, P.B., (Eds.), Methods for Fish Biology, American Fisheries Society, 1990, United States, pp. 213-272.
Verdon et al., "Recruitment of American Eels in the Richelieu River and Lake Champlain: Provision of Upstream Passage as a Regional-Scale Solution to a Large-Scale Problem", American Fisheries Society Symposium 33, 2003, United States, pp. 125-138.
Walker et al., "Effects of a Novel Acoustic Transmitter on Swimming Performance and Predator Avoidance of Juvenile Chinook Salmon: Determination of a Size Threshold", Fisheries Research 176, 2016, Netherlands, pp. 48-54.
Ward et al., "A Laboratory Evaluation of Tagging-Related Mortality and Tag Loss in Juvenile Humpback Chub", North American Journal of Fisheries Management 35, 2015, United States, pp. 135-140.
Wuenschel et al., "Swimming Ability of Eels (*Anguilla rostrata, Conger oceanicus*) at Estuarine Ingress. Contrasting Patterns of Cross-Shelf Transport?", Marine Biology 154, 2008, Germany, pp. 775-786.
Zale et al., "Effects of Surgically Implanted Transmitter Weights on Growth and Swimming Stamina of Small Adult Westslope Cutthroat Trout", Transactions of the American Fisheries Society vol. 134(3), 2005, United States, pp. 653-660.

* cited by examiner

ACOUSTIC TRANSMISSION DEVICES AND PROCESS FOR MAKING AND USING SAME

CROSS REFERENCE TO RELATED APPLICATION

This application is a 35 U.S.C. § 371 of and claims priority to PCT International Application No. PCT/US2014/053578, filed 29 Aug. 2014, which was published in English, and which is a Continuation-In-Part that claims priority from U.S. application Ser. No. 14/014,035 filed 29 Aug. 2013, and the teachings of which are incorporated herein by reference.

STATEMENT REGARDING RIGHTS TO INVENTION MADE UNDER FEDERALLY-SPONSORED RESEARCH AND DEVELOPMENT

This invention was made with Government support under Contract DE-AC05-76RLO1830 awarded by the U.S. Department of Energy. The Government has certain rights in the invention.

FIELD OF THE INVENTION

The present invention relates generally to acoustic tracking devices and systems. More particularly, the present invention relates to attachable acoustic transmission devices that allow detection and remote tracking of various hosts including inanimate objects and animate objects in up to three dimensions in real-time or as a function of time.

BACKGROUND OF THE INVENTION

Acoustic telemetry involves acoustic devices called acoustic tags that are commonly used to monitor behavior of fish. Acoustic tags transmit a sound signal or acoustic "ping" that sends identification information and location information about a tagged fish to a receiver. The receiver converts sound signals into digital data. Post processing software processes the digital data and provides positions of the tag when the receiver detects the same sound signal. By determining the sound's time of arrival at the hydrophone receiver, the position of the tag can be determined, allowing tracking of the host animal. Then, by tying the acoustic signature received from the transmitter to the programmed signal code, a specific animal may be identified. Acoustic telemetry has been used to observe behavior and assess survival of juvenile Chinook salmon as well as understand the biological effects of implantation of acoustic tags in yearling and sub-yearling Chinook salmon. Development of autonomous and cabled receiving systems deployed at dams and elsewhere in rivers has also been studied. Receiving systems detect signals emitted by the acoustic tags, process the resulting detection data to track the fish, and provide data necessary to estimate survival through dams and other routes of passage. Together, the acoustic tags and receiving systems in the Columbia River system make up the Juvenile Salmon Acoustic Telemetry System (JSATS). Although acoustic tags presently used for JSATS meet current tag burden guidelines for most yearling Chinook salmon, the tags are too large for smaller juvenile Chinook salmon, particularly those found in the lower Columbia River and estuary that enter the river downstream of the Bonneville Dam. Bioeffects studies also indicate that juvenile Chinook salmon less than 95 mm in length (approximately 9 g weight) implanted with current acoustic tags have reduced survival and growth rates. Accordingly, new tag designs are needed that reduce the overall size, weight, and volume, enhance the range and lifetime, reduce adverse effects associated with implantation, and broaden the range of potential applications. The present invention addresses these needs.

SUMMARY OF THE INVENTION

The present invention includes new acoustic transmission devices (acoustic tags) for identifying and remotely tracking various hosts in up to three dimensions in real-time or as a function of time, and a process for fabrication. "Form factor" as used herein refers to the physical arrangement, configuration, and dimensions of electrical components in the acoustic tags and the capsule that contains the device components. Acoustic tags may transmit location, identification, and sensor information in an encoded acoustic signal that propagates from the tag to an external receiver. The term "host" used herein refers to both inanimate and animate objects. Inanimate hosts may include, but are not limited to, e.g., self-propelled objects (e.g., robots), stationary objects, moveable objects, transportable objects, or other inanimate objects that may be propelled by various means (e.g., currents and tides). Animate hosts may include, but are not limited to, e.g., humans, animals, aquatic species including, e.g., marine and freshwater animals (e.g., eels), marine and freshwater fish, and other animate hosts. No limitations are intended. For example, various aquatic species including fish (e.g., salmon), deep water fish (e.g., sturgeon), and other animals (e.g., eel) in marine and freshwater environments may be tracked and/or identified. In some applications, both the tagged host and the external receiver may be located in an aquatic environment, but configurations are not intended to be limited. Applications for acoustic tags of the present invention may include, but are not limited to, e.g., survival studies; monitoring migration/passage/trajectories; tracking host behavior in two dimensions (2D) or three dimensions (3D); measuring bypass effectiveness at dams and other passages; observing predator/prey dynamics; helping public utility agencies, private firms, and state and federal agencies meet fishery or other regulations; and other applications. Applications are not intended to be limited.

Acoustic tags may include a containment vessel or structure that encapsulates components of the acoustic tags. The acoustic tag may include a rigid or flexible printed circuit board for coupling electronic components of the device. The containment structure may be made, e.g., of a thermosetting polymer such as an epoxide thermosetting polymer. The containment structure may include various defined shapes.

In some embodiments, the containment vessel may include an internal volume at or below about 115 mm$^3$ and include dimensions selected to contain components of the device in a selected configuration.

In some embodiments, the containment structure may include a length at or below about 15.0 mm and a diameter at or below about 3.4 mm.

In some applications, the containment structure may be an injectable containment structure with dimensions and shapes that that allows the tags to be injected into the host. In some applications, internal volumes may be less than about 115 mm$^3$.

Acoustic tags of the present invention may be attached to various hosts in a variety of ways.

In some embodiments, the acoustic tag may be an injectable acoustic tag. Injectable acoustic tags may be injected to attach the tag to the host animal and provide identification and tracking of the host. The containment vessel (container)

may have dimensions and a configuration that allows the acoustic tag to be injected into the host with a syringe needle. Locations for injection are not limited. In a fish, for example, acoustic tags may be injected into the body of the fish, e.g., along the linea alba or elsewhere. When injected into the host, injectable acoustic tags reduce bio-handling of the animal being tracked that can enhance survivability of the animals.

Acoustic tags of the present invention have a reduced size, weight, and volume that provide intensity outputs and lifetimes that exceed conventional JSATS tags. The reduced size, weight, and volume of the tags permit much smaller hosts to be studied including those with sizes that are too small for conventional JSATS tags. Tags of the present invention thus broaden the range of applications. Acoustic tags of the present invention are also less expensive to fabricate and to attach. In various applications, the tags can provide data and information useful for development of animal-friendly systems such as hydro systems.

In some embodiments, acoustic tags may have a dry weight of about 220 mg or less.

Acoustic tags may also include a power source to power operation of the device. The power source may be a single custom battery that delivers a voltage of from about 1.8 V to about 3.0 V. In some embodiments, the power source may supply an output voltage of at least about 2.5 volts. In some embodiments, the power source may be a lithium/carbon fluoride battery. The power source may include a plurality of laminates. Each laminate may include an anode and a cathode positioned between a polymer separator. The polymer electrically isolates the cathode from the anode in the laminate. In some embodiments, the separator may include a micro-porous polypropylene. The cathode may include, or be constructed of, e.g., carbon fluoride and a conducting carbon within a binder affixed at a selected thickness to a current collector. The binder may include, e.g., polytetrafluoroethylene (PTFE). In some embodiments, the cathode may include 85 wt % carbon fluoride, 10 wt % carbon, and 5 wt % polytetrafluoroethylene (PTFE) binder. The current collector may include a metal mesh composed, e.g., of aluminum, aluminum-containing alloys, or other metals and metal alloys. The anode may include various electrode materials including, e.g., lithium metal (Li), silicon (Si), tin (Sn), germanium (Ge), carbon-containing materials including, e.g., graphite, MesoCarbon MicroBead (MCMB) graphite powders, graphene, metal oxide-containing materials including, e.g., titanium oxide ($TiO_2$), tin oxide ($SnO_2$), silicon oxides ($SiO_x$), and germanium oxide (GeO) including combinations of these various materials. The cathode/anode laminates may be enclosed within a battery casing or container constructed of a high mechanical strength chemically resistant polymer of a selected thickness. The battery may also be filled with an electrolyte. The electrolyte may include a selected concentration of lithium hexafluorophosphate ($LiPF_6$) dispersed in a selected volume ratio of ethylene carbonate (EC) and dimethyl carbonate (DMC) that minimizes voltage drops within the power source during operation. In some embodiments, the power source may have a mass of about 75 mg or less. The power source may also have an energy density of at least about 230 Wh/kg.

Acoustic tags may include an infrared (IR) sensor that couples to the controller and provides an optical link to a host computer located external to the acoustic tag. The infrared sensor may receive programming and configuration information from the host computer that configures the controller for operation of the tag (e.g., to start transmission, to set the transmission frequency, and to select additional operations).

Acoustic tags may include a resonator, crystal, or other type of oscillator component to provide an external clock signal to the microcontroller. In some applications, the tag may use a ceramic resonator with a resonant frequency of about 10 MHz with about 0.5% precision.

Acoustic tags may include a controller that couples to the power source and controls various circuits and functions within the acoustic tag. In some embodiments, the controller may be a microcontroller that contains a processor core, memory, internal oscillators, timers, and programmable input and output peripherals which executes embedded firmware (source code) that defines the operation of the tags. The microcontroller may use an external clock signal to control circuits of the tag and generate the acoustic signal. The microcontroller may also use an external clock signal to calibrate internal oscillators and timers. The controller may be configured to automatically adjust the energy drawn from the power source as the power source discharges such that the acoustic source level remains substantially constant over the operation lifetime of the acoustic tag. The controller may also supply one or more tag codes.

Acoustic tags may be programmed for operation via an optical link from a computer to the tag. Acoustic tags may be programmed to transmit one or more encoded identification (ID) codes. Each tag code may include a code length of up to 64 binary bits. The controller may coordinate the timing and transmission of each of the tag IDs, alternating transmission of, e.g., a first tag ID and a second tag ID. In some applications, only a single tag code ID may be desired. Format of the tag codes is selectable. In some applications, one of the tag IDs may be configured to transmit data from various sensors incorporated into the acoustic tag. The coding may include configuring the number of cycles required per bit of data transmitted from the injectable acoustic transmission device. The coding may include programming the injectable acoustic transmission device to transmit the one or more identification codes within the acoustic signal transmitted from the injectable acoustic transmission device.

The acoustic transmission signal may be encoded with one or more tag codes and respective identification codes. Each tag code may have a selectable code length. Identification codes may have a selectable bit length.

Acoustic tags of the present invention incorporate advanced features including an ability to transmit an acoustic signal encoded with one or more tag codes. Acoustic tags may also store the distinct tag codes. Acoustic tags may also include one or more sensors (e.g., temperature from a temperature sensor) that collect data in the external or internal environment that may be encoded into the one or more tag codes. Transmission of the one or more tag codes increases the number of unique tag identifications (IDs) that may be transmitted in the acoustic signal while maintaining full backward compatibility with existing receiver equipment. Acoustic tags can also alternate transmissions between two tag codes. Each tag code is fully configurable including, e.g., selection of the code length (i.e., bit length) and the number of acoustic pulses per bit for maximum application flexibility. In some applications, code length may be up to 64-bits. In some applications, a shorter tag code may be used for acoustic transmissions that are, e.g., close to the water surface to decrease undesirable multipath effects. In some embodiments, tag codes may be identical or include an identical code length. Each tag code typically, but not exclusively, may be transmitted at regular intervals. However, transmission is not limited thereto. The acoustic signal may contain binary or derivative data encoded with phase-shift keying (PSK). The binary data may contain header bits (e.g., a "barker" code), a tag ID, data collected from the one or more sensors, error checking bits (e.g., a cyclic redundancy check), including various combinations of any or all of the above. Binary data within a single acoustic signal may include one tag code.

In some embodiments, the acoustic tag may include an acoustic reflector positioned adjacent to the piezoelectric transducer, e.g., behind the piezoelectric transducer. The acoustic reflector may reflect acoustic waves to enhance the acoustic signal transmitted from the piezoelectric transducer. For example, the reflector may achieve desired beam patterns by reflecting acoustic waves emitted from the back of the piezoelectric transducer which would otherwise propagate toward or interfere with electronic components, the battery, or other components of the acoustic tag. The acoustic reflector may be placed in direct contact with each individual piezoelectric transducer. In some embodiments, the acoustic reflector may be fashioned of a porous material that is filled with a gas such as air such as a closed-cell foam.

Sensors in the acoustic tags may include: accelerometers, rotational velocity sensors, magnetometers, pressure sensors, temperature sensors, other sensors, and combinations of these various sensors. Acoustic tags may embed sensor data into at least one of the tag codes and append error checking bits to tag codes based on encoded sensor data or numeric values. As an example, temperature data collected from a temperature sensor in the acoustic tag may be transmitted as part of the tag code.

Piezoelectric transducers may be configured to transmit the acoustic signal at a selected transmission rate at a selected intensity to a receiver located external to the acoustic transmission device.

Acoustic tags may include a piezoelectric transducer drive circuit that delivers a selected drive voltage to the at least one piezoelectric transducer that generates the acoustic transmission signal. In some embodiments, the acoustic tag may include a piezoelectric transducer drive circuit that includes a boost converter circuit that boosts (up converts) the voltage delivered from the power source to the at least one piezoelectric transducer. The boost converter circuit may couples to the microcontroller and power source. The boost converter circuit boosts (up converts) the power source (battery) voltage by up to about 3 volts to form a drive voltage. The boost converter circuit also permits the drive voltage to be adjusted to vary the intensity of the acoustic signal delivered by the piezoelectric transducer, e.g., between about 150 dB to about 158 dB to adjust the tag lifetime. Some energy is required by the boost converter circuit to up-convert the voltage for each transmission. Energy expenditure may be about 120 µJ per transmission at a signal intensity of about 155 dB. A drive circuit in the piezoelectric transducer drive circuit may be coupled to the boost converter circuit to deliver the drive voltage from the boost converter circuit to drive the vibrational modes of one or more piezoelectric transducers that generates the acoustic signal during operation, which may then be transmitted from the acoustic device tag. The boost converter circuit and drive circuit may couple to the microcontroller and to the power source. In some embodiments, the boost converter circuit may include a small (2.00 mm×1.25 mm×1 mm) inductor (L2) (e.g., a model BRL2012T101M 100 µH inductor, Taiyo Yuden Co., Ltd, Chicago, Ill., USA), a transistor (Q2) (e.g., a FET n-channel MOSFET transistor) and a diode (D1) (e.g., a Schottky diode) that together generate a high voltage (e.g., 6 V). The voltage may be stored in a capacitor (C1) (e.g., a 22 µF capacitor). Another transistor (Q3) (e.g., a FET n-channel MOSFET transistor) may be switched on and off by the microcontroller (U1) so that the piezoelectric transducer oscillates with another inductor (L1) at a desired resonance frequency, e.g., 416.7 KHz. Another capacitor (C2) (e.g., a 1 µF capacitor) may be a bypass tantalum capacitor that filters electronics noise on the power source (battery) and reduces maximum peak currents drawn from the power source. Operation lifetime of the acoustic tags configured with the booster circuit may be at least about 20 days at a transmission (ping) rate of 3 seconds at an average acoustic signal intensity of 155 dB.

In some embodiments, the acoustic tag may include a piezoelectric transducer drive circuit that includes a dual analog switch and a high-efficiency inductor configured to deliver a drive voltage that is up to about 3 volts above the power source voltage to the at least one piezoelectric transducer. Compared to the boost converter circuit described previously, the high-efficiency circuit may require fewer components. Fewer components decreases the energy required to power the tag, which permits yet smaller acoustic tags to be constructed for even smaller hosts and applications. In addition, the high-efficiency circuit may reduce the energy required to transmit the acoustic signal, which improves energy efficiency of the tag. In some applications, greater tag lifetimes permit habits of tagged fish and animals to be tracked over a much greater distance and lifetime. Energy expenditure may be below about 35 uJ at an acoustic signal intensity of between about 155 dB to about 156 dB.

In some acoustic tags, the piezoelectric transducer drive circuit may include a dual analog switch that couples to a high-efficiency (e.g., 100 µH) shielded inductor with selected dimensions (e.g., 2 mm×2 mm×0.6 mm) that enhances the voltage from the power source (battery) by up to about 3 volts to form the drive voltage. Dual analog switch and shielded inductor may couple to the microcontroller and power source. In some acoustic tags, a capacitor (e.g., a 33 µF, 6.3 V capacitor) and a resistor (e.g., a 470 ohm resistor) may be coupled to the power source to reduce the instantaneous peak current drawn from the power source. In the instant design, the dual analog switch may be turned on and off by the microcontroller to synchronize the oscillation of the high-efficiency inductor with the resonance frequency of the piezoelectric transducer, e.g., 416.7 kHz. Energy conversion efficiency for the instant embodiment is greater than the tag with the booster converter circuit. The high-efficiency circuit increases the lifetime of the acoustic tag by up to 3 times or longer. Tag lifetimes may be at least about 90 days at a transmission (ping) rate of 3 seconds at an acoustic signal intensity of about 155 dB to about 156 dB.

Acoustic tags may include one or more piezoelectric transducers. Each piezoelectric transducer may vibrate at a selected resonant frequency which transmits the encoded acoustic signal to a receiver. In some embodiments, the piezoelectric transducers may be of a spherical shell or tube geometry. The piezoelectric transducers may be an off-centered piezoelectric ceramic tube transducer or a spherical shell transducer in which the outer circumference and inner circumference of the transducers are not concentric. The inner circumference may include a center that is offset from the center of the outer circumference by a distance selected to enhance the acoustic signal in at least a forward transmission direction. The offsets maximize the acoustic energy emitted in the desired direction of transmission. Piezoelectric transducers may include an outer wall with an outer circumference and an inner wall with an inner circumference. The outer wall and inner wall of the piezoelectric transducer may be coated with an electrode that permits the piezoelectric transducers to be coupled to the circuit board. In some embodiments, the piezoelectric transducers may include end caps of a selected metal positioned at respective ends of the piezoelectric transducers which are configured to enhance the acoustic signal emitted from the ends of the piezoelectric transducers. In some embodiments, the piezoelectric transducers may be polarized (activated) along the wall thickness direction to produce a selected vibration at a selected resonance frequency. For example, when actuated by an AC voltage, the piezoelectric transducer may vibrate in the radial direction that resembles a breathing motion, i.e., the so-called "breathing" vibrational mode. Yet, vibrational modes are not limited. Length mode and thickness mode may also be used, either alone or in combination with "breathing mode". In some applications, the vibrational mode may be selected to be about 10 kHz to 50 kHz higher than the frequency of the drive signal that drives the transducer. Higher resonance frequencies can compensate for downshifts in the transducer frequency caused by the coating surrounding the transducers.

Another advanced feature of acoustic tags of the present invention is the ability to configure both the acoustic signal intensity (source level) and the acoustic transmission frequency. This feature allows the battery life to be optimized for selected applications. Acoustic tags may maintain the intensity of the acoustic signal output from the acoustic tag at approximately the same level while the battery discharges over the lifetime of the tag, which helps ensure consistency between data collected at different times. In some embodiments, the piezoelectric transducers may be configured to deliver the acoustic transmission signal at an intensity of at least about 153 dB.

Another advanced feature of acoustic tags of the present invention is an ability to configure the delay time before starting transmission of acoustic signals. This feature allows hosts such as fish to be tagged prior to their migration time. In various applications, delay period may be up to 30 days or more. In addition, acoustic tags can also be placed in a minimal power state (sleep mode) so that tags can be stored for a year or more before use.

The acoustic signal when received from the acoustic transmission device may be decoded to identify and track the host in up to three dimensions in real-time or as a function of time.

In some applications, the receiver may be an acoustic hydrophone. The acoustic signal released from the piezoelectric transducers of the acoustic tags may be transmitted at a signal intensity that is programmable, which results in a selectable detection range.

The present invention also includes a method for identifying and tracking a selected host in real-time or as a function of time. The method for transmission of identification and location information about a host may include attaching the acoustic tag to the selected host at a selected location. The acoustic tag may transmit the acoustic signal from at least one piezoelectric transducer at a selected acoustic intensity and a selected frequency over a selected distance to a receiver positioned external to the host. The acoustic signal may be encoded with one or more tag codes of a selected code length. The acoustic signal containing location data and identification data about the host and/or sensor data may be transmitted from the acoustic tag to a receiver located external to the host. The method may also include decoding the acoustic signal received from the acoustic tag to identify and track the host in up to three dimensions in real-time or as a function of time.

Features of the acoustic tags can be tailored for various applications and projects. For example, in some applications, tag studies may be conducted for animals located in lakes, rivers, tributaries, estuaries, and at sea. For example, animals including fish (e.g., salmon), deep water fish (e.g., sturgeon), and other marine and freshwater animals (e.g., eel) in marine and freshwater environments may be tagged and then tracked in up to three dimensions (3D) (i.e., X-Y-Z coordinates) in real-time or as a function of time. Applications for acoustic tags of the present invention may include, but are not limited to, e.g., survival studies; monitoring migration/passage/trajectories; tracking host behavior in two dimensions (2D) or three dimensions (3D); measuring bypass effectiveness at dams and other passages; observing predator/prey dynamics; helping public utility agencies, private firms, and state and federal agencies meet fishery or other regulations; and other applications. Applications are not intended to be limited.

The foregoing summary is neither intended to define the invention of the application, which is measured by the claims, nor is it intended to be limiting as to the scope of the invention in any way.

DETAILED DESCRIPTION

New acoustic transmission devices including injectable acoustic tags and a process of making are detailed. Acoustic tags of the present invention provide identification and remote tracking of various hosts in up to three dimensions (3D) (i.e., X-Y-Z coordinates) in real-time or as a function of time. In the following description, embodiments of the present invention are shown and described by way of illustration of the best mode contemplated for carrying out the invention. It will be apparent that the invention is susceptible of various modifications and alternative constructions. It should be understood that there is no intention to limit the present invention to specific forms disclosed herein, but, on the contrary, the present invention is to intended cover all modifications, alternative constructions, and equivalents falling within the scope of the present invention as defined in the claims. Therefore the description should be seen as illustrative and not limiting.

Figure 1A:
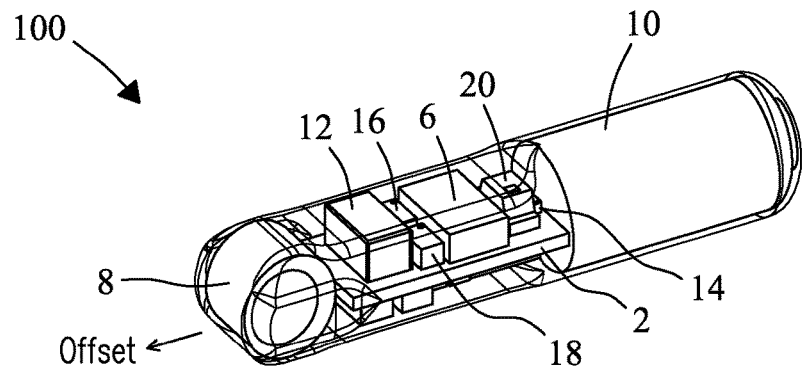
FIGS. 1A-1C show different views of an embodiment of the present invention.

FIG. 1A illustrates a top view of an acoustic transmission device (tag) 100 of a selected design showing exemplary components. Acoustic tags of the present invention may include various form factors and shapes that allow the tags to be attached to selected hosts or otherwise tailored for selected applications. In some embodiments, tag 100 may have a generally elongated or cylindrical shape that permits the tag to be injectable into the host. However, shapes are not intended to be limited. And, attachment of tags is not limited to injectable hosts and injectable applications. While various components are described herein, components and configuration are exemplary and not limited. Components of tag 100 may be mounted onto a circuit board 2 constructed of suitable or selected circuit board materials. Circuit board 2 materials may include, but are not limited to, e.g., rigid materials such as FR4 boards (~0.02 cm thickness) or flexible materials such as flex boards (~0.01 cm thickness). In various embodiments, electrical circuits and/or device components of tag 100 may be positioned on both the top and bottom sides of circuit board 2. Circuit board 2 may include electrical circuits with exemplary spacing widths and copper line widths of about 0.01 cm (0.003 inches). However, spacing and line widths are not limited.

Tag 100 may include a controller (U1) 6 that controls operation of components and circuits of the tag. A piezoelectric transducer 8 may be positioned at a forward end of the tag so that the acoustic signal may be transmitted from the tag without encountering interference from tag components such as an inductor 12 or other components of the tag. In the figure, piezoelectric transducer 8 is shown electrically coupled to circuit board 2 but does not require residence on circuit board 2. A power source 10 may be coupled to circuit board 2 to power components of the tag. In some embodiments, power source 10 may be positioned at an end opposite to piezoelectric transducer 8 to minimize any potential blockage of the acoustic signal caused by the physical size of the power source 10. However, location is not limited. A capacitor (C1) 14 (e.g., a 22 µF, 10 V capacitor) may act as a decoupling capacitor for the power source to help smooth any electrical noise. A first MOSFET transistor (Q2) 16 may form part of a boost converter circuit described further herein. A second MOSFET transistor (Q3) 18 and an inductor (L1) 12 (e.g., a 47 µH inductor) may form a drive circuit described further herein. A phototransistor (Q1) 20 sensitive to infrared radiation may provide an optical link to an external programmer module (FIG. 3B) for receipt of commands that configure microcontroller 6 for operation. Components of tag 100 may be encapsulated within a coating that defines a capsule 4. Capsule 4 may be composed of a thermosetting polymer such as an epoxy (e.g., EPO-TEK® 301 epoxy, Epoxy Technology Inc., Bellerica, Mass., USA) or a resin (e.g., Electrical Resin 5, 3M Company, St. Paul, Minn., USA). Capsule 4 may include an exemplary length of about 15 mm, but length is not limited. Diameter of capsule 4 at the widest point along the length may be about 3.4 mm. Final dry weight may be at or below about 228 mg.

Figure 1B:
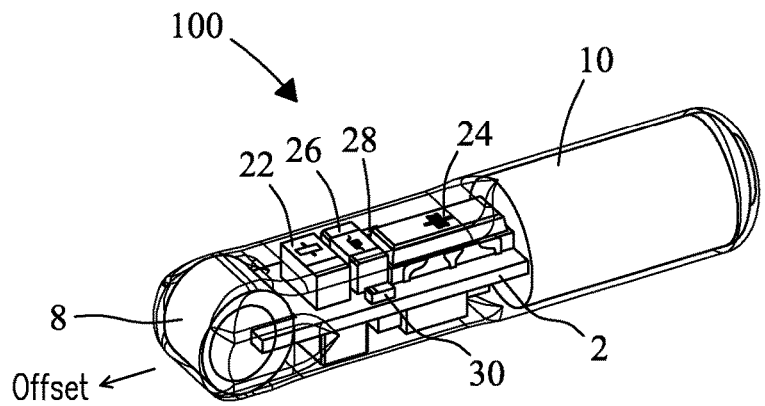

FIG. 1B illustrates a bottom view of acoustic transmission tag 100 showing exemplary components on a bottom side of circuit board 2. A capacitor (C2) 22 (e.g., a 1 µF, 4V capacitor), an inductor (L2) 26 (e.g., a 100 µH inductor), and a diode (D1) 30 (e.g., a Schottky diode) together form part of a boost converter circuit described further herein. A resonator (Y1) 24 (e.g., a 10 MHz ceramic resonator) may couple to the microcontroller (FIG. 1A) to produce a clock signal for controlling the operation of that microcontroller. A resistor (R1) 28 (e.g., a 1 M-ohm resistor) may couple to the resonator to help stabilize the clock signal. Power source 10 may provide power to piezoelectric transducer 8 and other components of the tag for operation.

Figure 1C:
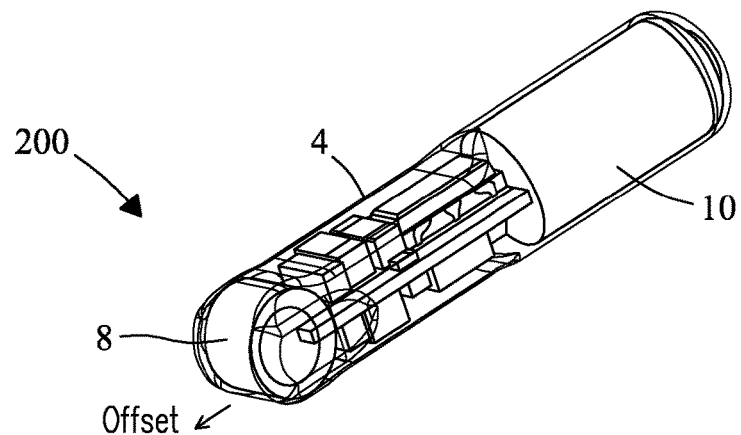

FIG. 1C shows an acoustic transmission tag 200 of a "baseball bat" capsule design. In the instant embodiment, components of the tag are encapsulated in a capsule 4 that has an appearance of a baseball bat, with a narrowed front end (the "handle" of the "bat"), and a power source 10 positioned at a back end of the capsule (the "hitting end" of the "bat") that delivers power to piezoelectric transducer 8 and other components of the tag. The narrowed dimension at the front end of the tag reduces weight and volume of acoustic transmission tag 200 for use as an injectable tag. However, attachment of these tags to hosts is not limited. In the instant embodiment, capsule 4 may have an exemplary length of about 15 mm, but dimensions are not intended to be limited. Diameter of tag 200 at the widest point along the length of the capsule (i.e., at the location of the power source 10) is about 3.4 mm. Average weight may be between about 216 mg and about 218 mg when EPO-TEK 301 epoxy or 3M Electrical Resin 5 is used as the coating material.

Figure 2A:
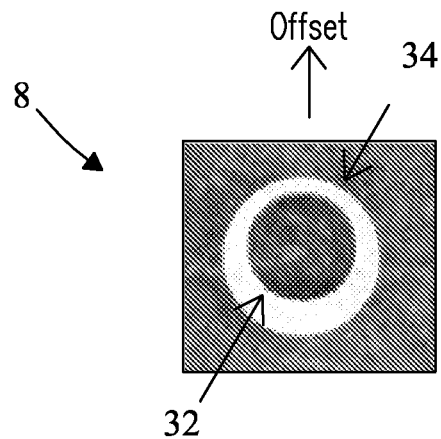
FIGS. 2A-2C show different views of piezoelectric transducers of the present invention.

FIG. 2A shows a top view of a piezoelectric tube transducer 8 of an offset inner circumference (IC) design. Piezoelectric transducer 8 converts electrical energy from the power source into an acoustic (e.g., ultrasonic) signal that is transmitted to a receiver (not shown). Piezoelectric transducers 8 may be constructed of any suitable piezoelectric ceramic material including, e.g., lead zirconate titanate (PZT), lead magnesium niobate-lead titanate (PMN-PT), or lead-free ceramic materials such as sodium potassium niobate (KNN) and bismuth sodium titanate (NBT). IC-offset piezoelectric transducer 8 may include an inner wall 32 and an exterior (outer) wall 34 that are not concentric. The circumference of inner wall 32 may be offset from the center position of exterior wall 34. When assembled into the injectable tag, the IC-offset piezoelectric transducer 8 may be oriented with the thinnest portion of the transducer wall facing the front of the tag. The offset maximizes energy delivered from the piezoelectric transducer in the direction of the offset. Dimensions of piezoelectric transducer 8 may be tailored to provide a selected operation frequency. Frequencies are not limited. In some embodiments, the resonance frequency is selected to be about 416.7 kHz. In the instant embodiments, IC-offset piezoelectric transducer 8 may include an exterior (outer) wall 34 with an O.D. of about 2.4 mm to about 2.6 mm, an inner wall 32 with an I.D. of about 1.7 mm to about 1.9 mm, and a thickness in the offset direction of about 0.15 mm. Dimensions of piezoelectric transducer 8 may include a tolerance at least about ±0.05 mm. In some embodiments, piezoelectric transducer 8 may have a resonance frequency about 10 kHz to 50 kHz higher than the frequency of the drive signal that drives piezoelectric transducer 8. The higher frequency compensates for frequency downshifts that may be caused by the epoxy or resin coating on the piezoelectric transducer.

Figure 2B:
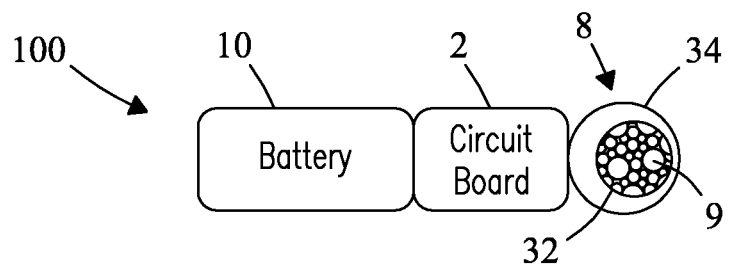

FIG. 2B is a schematic showing acoustic transmission device 100 in assembled form configured with an inner circumference (IC)-offset piezoelectric transducer 8 positioned at a front end of the device, a power source (battery) 10 at a back end of the device, and a circuit board 2 in the middle section. IC-offset piezoelectric transducer 8 may include an inner wall 32 with an inner circumference (IC) and an exterior (outer) wall 34 that are offset in the forward transmission direction. The offset may enhance the source level of the acoustic signal when the piezoelectric transducer is polarized along the wall-thickness direction. A closed-cell foam 9 composed of, e.g., ethylene propylene diene monomer (M-class) rubber (EPDM) rubber or a like elastomer may be positioned so as to be bounded by inner wall 32 of piezoelectric transducer 8. Foam 9 may enhance acoustic properties of piezoelectric transducer 8. Dimensions of IC-offset piezoelectric transducer 8 are selected that maximize the transmission range of the acoustic signal. IC-offset piezoelectric transducer 8 is preferably oriented so that the direction of the IC-offset points toward a receiver (e.g., a hydrophone, not shown) that detects the acoustic signal emitted by the piezoelectric transducer 8, but orientation is not limited.

Figure 2C:
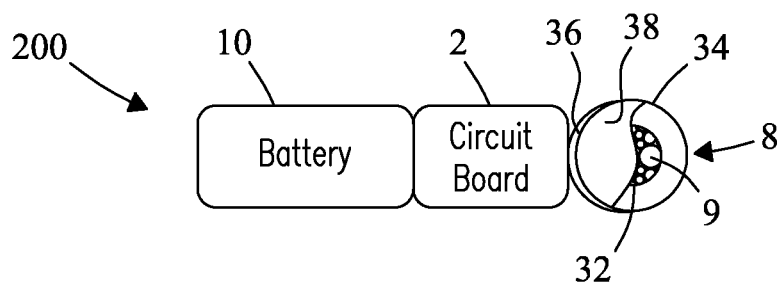

FIG. 2C shows a schematic of an acoustic transmission device 200 of a baseball bat design. In the figure, piezoelectric transducer 8 may include an inner wall 32 and an exterior (outer) wall 34 that are concentric or that are offset as detailed previously herein. Tag 200 may also include an acoustic reflector 36 positioned behind piezoelectric transducer 8 in front of power source (battery) 10 and circuit board 2. Acoustic reflector 36 reflects acoustic signals emitted from piezoelectric transducer 8 and enhances transmission, e.g., in the forward direction from the acoustic (tag) 200 as detailed further herein. In some embodiments, acoustic reflector 36 may include or be composed of an ultra-low density material such as EPDM closed-cell foam with a thickness of, e.g., ~0.3 mm, which may be attached to the back surface of piezoelectric transducer 8 in front of circuit board 2. The foam may introduce an interface with a large acoustic impedance mismatch greater than about $20 \times 10^6$ kg/(m$^2$·s) that redirects acoustic energy towards the front end of injectable tag 200. In addition, acoustic reflector 36 enhances the source level of the acoustic energy output from piezoelectric transducer 8 along the forward 180 degree wavefront by at least a factor of about 0.5 dB to about 1 dB on average, but acoustic energy values are not intended to be limited. In various embodiments, acoustic reflector 36 may include various selected thicknesses. In some embodiments, width of acoustic reflector 36 may be below about 1.5 mm to avoid blocking acoustic signals emitted from the two (i.e., left and right) sides of piezoelectric transducer 8. Thickness of acoustic reflector 36 depends in part on the size of the pores within the closed-cell foam. Thickness is preferably 2 to 3 times the size of pores within the reflector material to ensure acoustic waves encounter EPDM/air interfaces within the reflector foam at least once in order to maximize effectiveness of the reflector.

As discussed previously, a closed-cell foam 9 composed of, e.g., EPDM rubber or a like elastomer may be positioned so as to be bounded by inner wall 32 of piezoelectric transducer 8 that enhances acoustic properties of piezoelectric transducer 8. In some embodiments, piezoelectric transducer 8 may also include end caps 38 of a selected thickness (e.g., ~0.2 mm) positioned at respective flat ends of transducer 8. End caps 38 may include or be composed of a selected metal such as copper (Cu) metal. End caps 38 may be bonded to piezoelectric transducer 8 using, e.g., a non-conductive epoxy. End caps 38 can serve to enhance the source level of the acoustic signal emitted from flat ends of transducer 8.

Figure 3A:
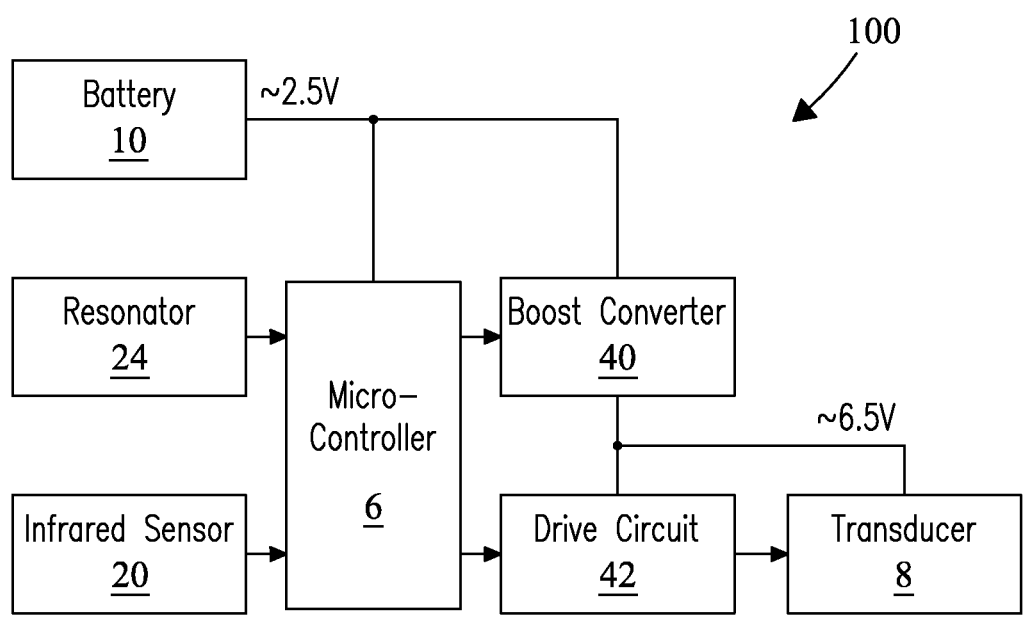
FIGS. 3A-3C show various block and circuit diagrams for an embodiment of the present invention.

FIG. 3A is a block diagram showing various components of acoustic tag 100. While the acoustic tag is of an injectable design particularly suited for attachment to a host by injection, the tag is not limited to such applications. Attachment is also not limited. Tag 100 may include a controller 6 (e.g., a 6-pin microcontroller). The term "microcontroller" does not imply or limit selected dimensions for this component. A ceramic resonator 24 may be coupled to microcontroller 6 and used to generate a clock signal for coordinating operation of various circuits. An infrared sensor 20 may provide an optical link that receives and delivers configuration commands from an infrared programmer module (FIG. 3B) to controller 6. Configuration commands may specify various parameters for the operation of the microcontroller, including, but not limited to, e.g., tag codes, period between transmissions, and other operation parameters. A piezoelectric transducer drive circuit may include a boost converter circuit 40 that enhances the voltage released from power source 10 which yields a drive voltage, and a drive circuit 42 that subsequently delivers the drive voltage to piezoelectric transducer 8. The drive voltage drives the transducer to transmit an encoded acoustic signal at a specified frequency as detailed further herein.

Figure 3B:
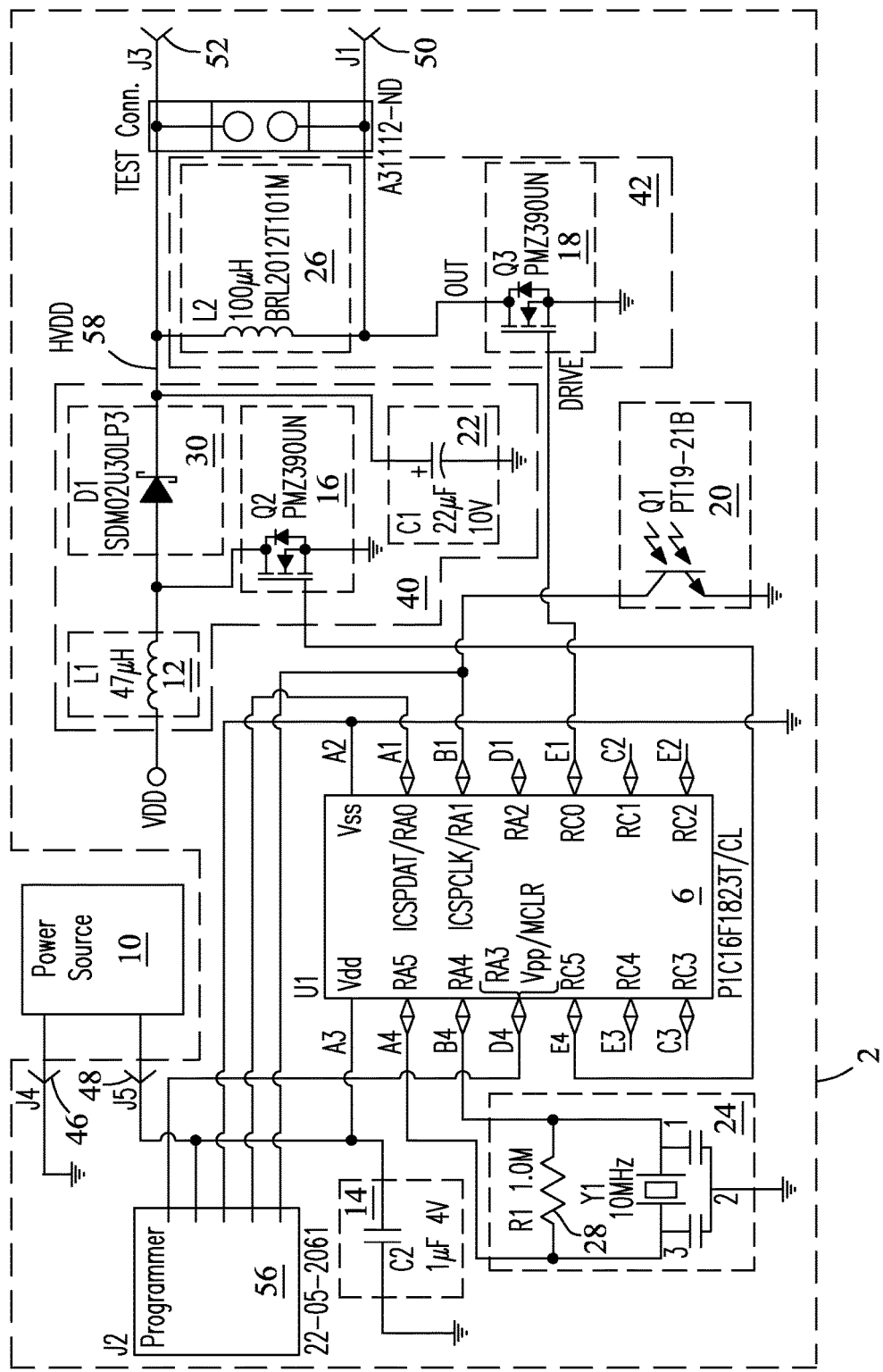

FIG. 3B is a circuit diagram showing exemplary circuits and associated device components for the embodiment of FIG. 3A. While the acoustic tag is of an injectable design with dimensions particularly suited for attachment to a host by injection, the tag is not limited to such applications. Components described hereafter provide reduced physical dimensions and weights to the tag and allow circuits to operate at comparatively high efficiencies given their smaller sizes. However, components are not intended to be limited. All components as will be selected by those of ordinary skill in the art in view of the description are within the scope of the present invention. No limitations are intended.

The acoustic transmission device (tag) of the instant embodiment may include a controller (U1) 6 (e.g., a model PIC16F1823T/CL 8-bit, 8K flash, programmable microcontroller in a chip-scale package, Microchip Technologies, Chandler, Ariz., USA) with a low current draw (e.g., 20 nA in sleep mode, or 300 nA in sleep mode with the watchdog timer active). Controller 6 is preferably a programmable component that controls operation of electrical components and circuits within acoustic tag 100. Controller 6 may operate from input voltages between about 1.8 V and about 3.6 V. Selected voltages are compatible with a power source (battery) 10. Controller 6 may include modules or components such as, e.g., an internal oscillator; sleep mode; interrupt-on-change capability; a fixed voltage reference; a temperature sensor; timers; pulse width modulators; and a Universal Asynchronous Receiver/Transmitter (UART). Controller 6 generates control signals for both a boost converter circuit 40 and a drive circuit 42.

Power source (battery) 10 may be connected to terminals (J4) 46 and (J5) 48 on either each side of circuit board 2 during assembly. Piezoelectric transducer 8 may be connected to terminals (J3) 50 and (J1) 52 on opposite sides of circuit board 2 at an end opposite power source 10. A bypass (or decoupling) capacitor (C2) 14 (e.g., a 1-µF 4V X5R 20% tantalum capacitor, Taiyo Yuden Co., Ltd, Schaumburg, Ill., USA) may be used to help filter any electronics noise on power source 10 and reduces maximum peak currents drawn from power source 10 when controller 6 or boost converter circuit 40 draws current.

A resonator (Y1) 24 (e.g., a 10.0 MHz SMD ceramic resonator, Murata Manufacturing Co., Ltd., Nagaokakyo, Kyoto Prefecture, Japan) may be coupled on the input side of controller 6 to generate a precise clock signal with a selected precision (e.g., ±0.5% precision) that controls operation of controller 6. A resistor (R1) 28 (e.g., a 1.0 MOhm, 1/20 W, 5% SMD resistor, Vishay Intertechnology, Inc., Malvern, Pa., USA) may be placed in parallel with resonator 24 to reduce startup time and improve stability of the generated clock signal. Controller 6 may use the clock signal to generate control signals for boost converter circuit 40 and drive circuit 42. Control signals from controller 6 permit drive circuit 42 to generate an acoustic signal at desired modulation frequencies on piezoelectric transducer 8, e.g., 416.7 kHz. The clock signal controls and modulates the (modulation) frequency.

A phototransistor (Q1) 20 (e.g., a Flat Black Mini (3-mm) SMD Phototransistor, Everlight Electronics Co., Ltd., Taipei, Taiwan) or unidirectional infrared sensor that is sensitive to infrared light when activated by infrared light receives configuration commands through an optical link that transfers the commands into controller 6. Commands configure various parameters of the tag including, e.g., tag codes, transmission period, and other parameters for operation prior to or following attachment of the tag to the host. The infrared link is reliable, simple, requires a minimum number of components, and avoids false triggering problems. Phototransistor (Q1) 20 may couple to controller 6 using an input pin such as a UART pin (not shown) configured with "interrupt-on-change" capability that produces an interrupt, e.g., upon a positive and/or negative change in logic level. Pin selections are not limited. The optical link of phototransistor 20 may be used to interface the injectable tags to an external infrared Integrated Circuit Serial Programmer (ICSP) module (Programmer) 56 (e.g. a MPLAB ICD 3 programmer, Microchip Technologies, Chandler, Ariz., USA). Programmer module 56 may load configuration and programming information including firmware code into controller 6. Programmer 56 may connect to an RS-232 serial port (not shown) of a host computer (not shown). The external infrared programmer module may include an infrared LED (not shown) that indicates when the programmer is "on" or "off". For example, the LED is "on" when the transmit line is logic 0 (positive voltage), and "off" when the transmit line is logic 1 (negative voltage). Writing bytes to the serial port of the host computer transmits those bytes across infrared link 20 (i.e., from the infrared LED to phototransistor 20) into the tag controller 6. Infrared link 20 provides no direct feedback to the host computer. Data transmission protocol over infrared link 20 may consist of a 2-second serial break followed by a stream of bytes. The serial break turns on the infrared LED on infrared programmer module 56 for an extended period of time so that microcontroller 6 may sense the infrared light and prepare to configure parameters. The stream of bytes may consist of an initial check byte, a byte that indicates the total number of data bytes in the transmission, and the selected data bytes. Data bytes may specify values for the internal microcontroller parameters in a predefined order. The host computer may run an exemplary MATLAB (MathWorks, Inc., Natick, Mass., USA) software program that delivers configuration information through a serial port into the infrared programmer. While MATLAB is described, other computer programming languages may be used. No limitations are intended.

In some embodiments, phototransistor 20 provides a transfer rate of about 300 baud. However, parameter transfer rates are not intended to be limited. Phototransistor 20 generally operates as a simple pull-down transistor triggered by infrared light. Controller 6 may activate a weak internal pull-up resistor to generate a logic high input on the input pin (e.g., a UART pin) when phototransistor 20 is not activated. Controller 6 may disable phototransistor 20 to save power by driving the input pin to ground.

In some embodiments, the piezoelectric transducer drive circuit may include a boost converter circuit 40 that enhances the voltage of power source (battery) 10 to a higher voltage that becomes the drive voltage. A drive circuit 42 may be coupled to boost converter circuit 40 to deliver the drive voltage to piezoelectric transducer 8 that then drives piezoelectric transducer 8. Boost converter circuit 40 may include an inductor (L1) 12 (e.g., a 47 µH, 35 mA 20% inductor, TDK Corp., New York, N.Y., USA) that stores magnetic energy as an electronic current, a MOSFET transistor (Q2) 16 (e.g., a FET n-channel type 30V, 1.78 A MOSFET, Fairchild Semiconductor, San Jose, Calif., USA) that switches on and off repeatedly, a diode (D1) 30 (e.g., a 30V diode, Diodes Incorporated, Plano, Tex., USA) that conducts current primarily in one direction toward the output, and a capacitor (C1) 22 (e.g., a 22-µF 10V 20% tantalum capacitor, Vishay Sprague, Malvern, Pa., USA) that stores an elevated voltage delivered from boost converter circuit 40. MOSFET transistor (Q2) 16 is coupled to the output of controller 6. When transistor (Q2) 16 is switched "on" by controller 6, current begins to increase in inductor (L2) 26. When transistor (Q2) 16 is switched back "off" by microcontroller 6, current from inductor (L1) 12 is delivered through diode (D1) 30 into capacitor (C1) 22 which charges the capacitor. Controller 6 may switch transistor (Q2) 16 "on" and "off" a selected number of times to charge capacitor (C1) 22 to a desired value. Capacitor (C1) 22 may have a minimum rating of about 10 V and a capacitance of at least about 22 µF to minimize voltage drops while drive circuit 42 is drawing current. Boost converter circuit 40 delivers a suitable drive voltage (HVDD) 58 as an input to drive circuit 42.

Drive circuit 42 may be coupled to the output side of microcontroller 6 to deliver the drive voltage released from boost converter circuit 40 that drives transmission of the acoustic signal from piezoelectric transducer 8. Drive circuit 42 may define the signaling levels and signaling approach of the injectable acoustic tag. Drive circuit 42 may include an inductor (L2) 26 (e.g., a 100 µH 85 mA 20% SMD Inductor, Taiyo Yuden Co., Ltd, Schaumburg, Ill., USA) that stores magnetic energy as an electronic current, and a MOSFET transistor (Q3) 18 (e.g., a n-channel type 30V, 1.78 A SOT-883 MOSFET, Fairchild Semiconductor, San Jose, Calif., USA) that switches on and off. Transistor (Q3) 18 may be coupled to an output pin of controller 6. Drive circuit 42 may attach to terminals (J1) 50 and (J3) 52 of circuit board 2. Voltage at connector 52 is tied to elevated voltage (HVDD) 58.

When transistor (Q3) 18 is switched "on" by microcontroller 6, current begins to increase in inductor (L2) 26. Voltage at connector 52 may be set to ground. When transistor (Q3) 18 is then switched "off" by microcontroller 6, inductor (L2) 26 and piezoelectric transducer 8 conceptually form a resonant LC circuit. Voltage at connector 52 of piezoelectric transducer 8 may oscillate at a frequency determined by the inductance of inductor (L2) 26 and the characteristic capacitance of piezoelectric transducer 8. Oscillation frequency may be greater than the desired modulation frequency of the acoustic signal. Voltage on connector 52 may increase above drive voltage (HVDD) 58 and then return to near ground. Transistor (Q3) 18 may be switched back "on" by controller 6 to prevent further oscillations from taking place in piezoelectric transducer 8. Voltage differences across piezoelectric transducer 8 connected between terminal 50 and terminal 52 may thus range between negative and positive values.

Controller 6 may switch transistor (Q3) 18 "on" and "off" in a particular pattern that generates a desired or selected oscillation frequency that drive circuit 42 can apply to the piezoelectric transducer to generate the correct acoustic waveform at the selected frequency. To transmit a series of acoustic pulses representing one bit of the tag code, microcontroller 6 may apply a square wave to transistor (Q3) 18 with the desired modulation frequency (e.g., 416.7 kHz). The duty cycle of the square wave is typically 33% so that transistor (Q3) 18 may be switched "on" for one-third of each modulation period, and inductor (L2) 26 and piezoelectric transducer 8 may be allowed to oscillate for two-thirds of each modulation period. When transitioning from a logic "0" bit to a logic "1" bit, or vice versa, microcontroller 6 may delay a next pulse by a time period that is one-half of a modulation period. This procedure produces an acoustic signal from piezoelectric transducer 8 that includes encoded binary data implemented, e.g., by way of phase-shift keying (PSK).

In various embodiments, separate MOSFET transistors (Q2) 16 and (Q3) 18 may be used rather than a single dual-channel MOSFET transistor to facilitate layout and design on circuit board 2, but configuration is not intended to limited thereto. Further, components on circuit board 2 described herein may be placed in close proximity to minimize length of the tags. For example, resonator 24 and inductor (L2) 26 may be in contact after board assembly without problems since resonator 24 has a perimeter surrounded by a nonconductive material.

Figure 3C:
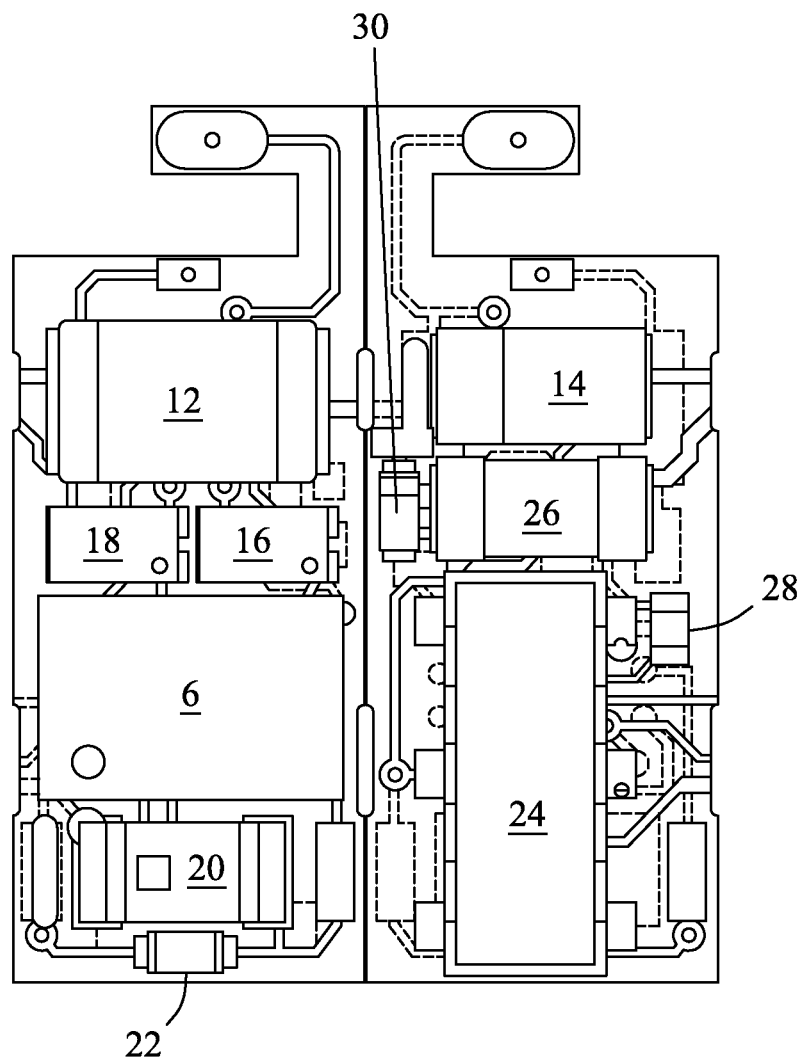

FIG. 3C illustrates an exemplary circuit board design showing representative components for the acoustic tag described previously in reference to of FIG. 3A.

Figure 3D:
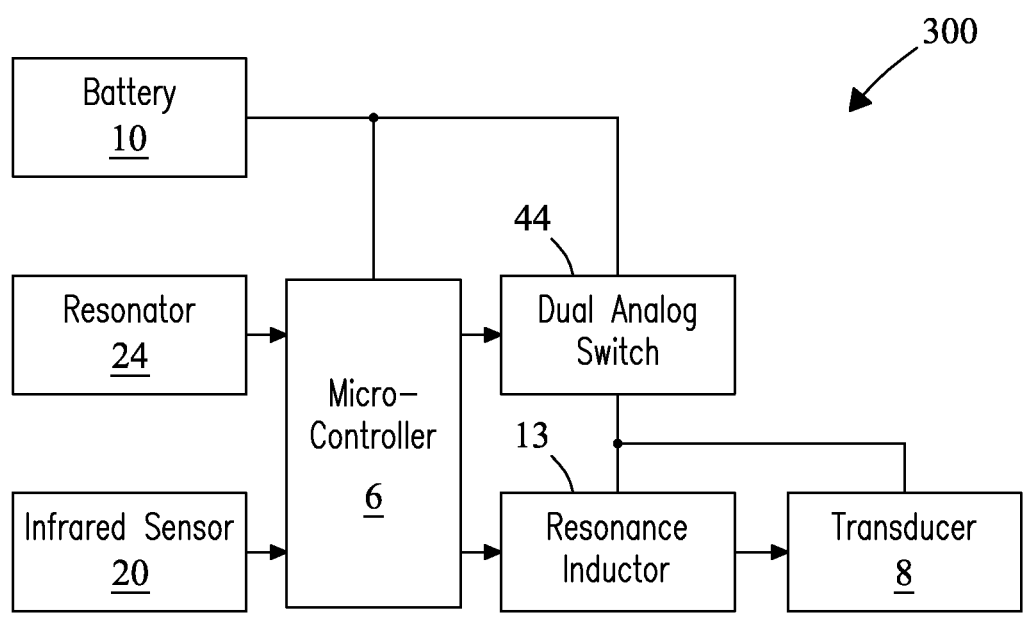
FIGS. 3D-3F show various block and circuit diagrams of another embodiment of the present invention.

FIG. 3D is a block diagram showing various components of another acoustic transmission device (tag) 300 of the present invention. In the figure, tag 300 may include an inductor circuit that includes a dual (e.g., a 2-in-1) analog switch 44 that couples electrically to a high-efficiency inductor 13 (e.g., 100 uH inductor) that replaces the boost converter circuit described previously in reference to FIG. 3B. Each analog switch in switch 44 is configured to deliver a different voltage of either 0 or 3V that alternates between the two analog switches. Dual analog switch 44 delivers a net voltage of 6V across the inductor 13 and piezoelectric transducer 8 sub-circuit. The inductor circuit of tag 300 is a high-efficiency circuit that lowers the energy required for transmission of the acoustic signal from PZT 8 by a factor of 3 or more (e.g., from 120 µJ for the booster circuit design described previously down to 35 µJ) that increases the lifetime of the tag by up at least 3 to 4 times, e.g., from 20 days to 90 days or longer at a transmission rate of 3 seconds.

In the instant design, the resonant induction circuit of the instant embodiment delivers the 6V drive voltage ($V_{RMS}$) to PZT 8, which is at least about 3 volts above the power source 10 voltage. The instant design enhances the energy conversion efficiency, reduces the number of dedicated components, while maintaining the same source level performance. Tags of the instant embodiment are particularly suited, e.g., for deep water host applications, or applications that require longer lifetimes, or applications that involve longer distances. However, no limitations are intended. Dual analog switch 44 and inductor 13 may be governed by microcontroller 6 as described previously herein. Tag 300 may also include other components described previously herein including, but not limited to, e.g., infrared sensor 20 and resonator 24. No limitations are intended.

Figure 3E:
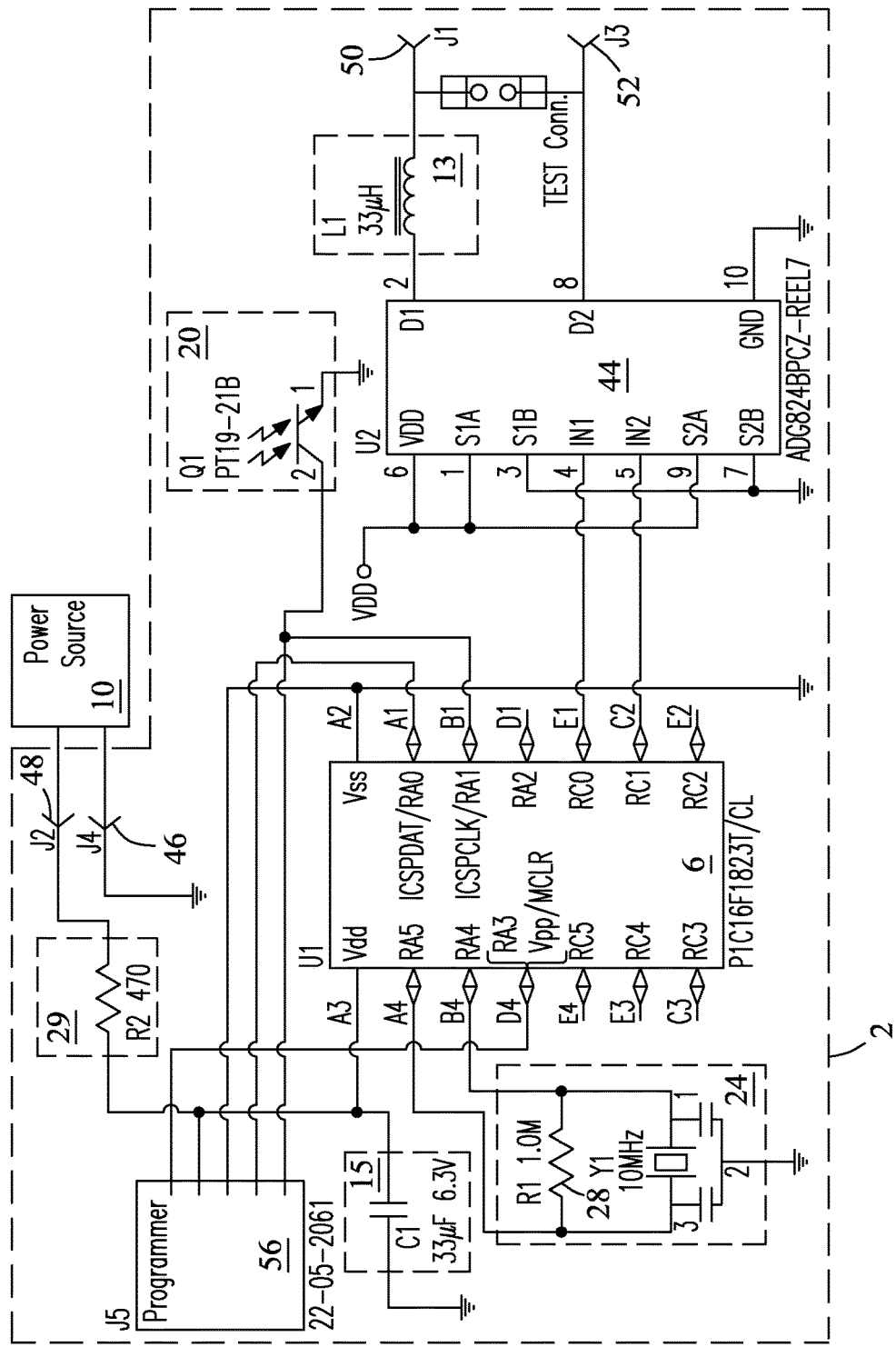

FIG. 3E illustrates a circuit diagram for the acoustic tag described previously in reference to FIG. 3D. The piezoelectric transducer drive circuit may includes a dual analog switch (U2) 44 that couples to a high-efficiency shielded inductor (L1) 13 [e.g., 100 µH inductor]. Inductor 13 may include selected dimensions (e.g., 2 mm×2 mm×0.6 mm). Dual analog switch 44 and shielded inductor 13 may couple to a microcontroller (U1) 6 and to a power source 10 described previously herein. Power source (battery) 10 may connect to terminals (J4) 46 and (J2) 48 on either each side of circuit board 2 during assembly. Controller 6 may switch individual analog switches of dual analog switch 44 "on" and "off" in a pattern that generates a desired or selected oscillation frequency that can then be delivered to the piezoelectric transducers to generate the correct acoustic waveform at the selected frequency. For example, controller 6 generates control signals to the piezoelectric transducer drive circuit. Piezoelectric transducer drive circuit configured with dual analog switch 44 and high-efficiency inductor 13 enhances the voltage from the power source (battery) 10 by up to about 3 volts to generate a drive voltage that may be delivered to drive the piezoelectric transducer (FIG. 3D). The clock signal controls and modulates the (modulation) frequency. In the instant design, dual analog switch 44 may be turned on and off by microcontroller 6 to synchronize the oscillation of high-efficiency inductor (L1) 13 with the resonance frequency of the piezoelectric transducer that generates the acoustic signal at desired modulation frequencies, e.g., 416.7 kHz. Piezoelectric transducer drive circuit including dual analog switch (U2) 44 and high-efficiency inductor (L1) 13 may attach to terminals (J1) 50 and (J3) 52 of the circuit board. Voltage at connector 52 may oscillate at a frequency determined by the inductance generated by high-efficiency inductor (L1) 13. Voltage differences between terminal 50 and terminal 52 may vary and may range between negative and positive values.

In the instant embodiment, a capacitor (C1) 15 (e.g., a 33 µF, 6.3 V capacitor) and a resistor (e.g., a 470 ohm resistor) (R2) 29 may couple to power source 10 to reduce the instantaneous peak current drawn from the power source. A resonator (Y1) 24 (e.g., a 10 MHz ceramic resonator, Murata Manufacturing Co., Ltd., Nagaokakyo, Kyoto Prefecture, Japan) may be coupled on the input side of controller 6 to generate a precise clock signal with a selected precision (e.g., ±0.5% precision) that controls operation of controller (U1) 6. A resistor (R1) 28 (e.g., a 1.0 MOhm resistor) may be placed in parallel with resonator 24 to reduce startup time and improve stability of the generated clock signal. A phototransistor (Q1) 20 or a unidirectional infrared sensor may be installed to receive configuration commands from a host computer through an optical link that transfers the commands into controller 6. Commands configure various parameters of the tag including, e.g., tag codes, transmission period, and other parameters for operation prior to or following attachment of the tag to the host. Phototransistor 20 optical link may interface the acoustic tags to an infrared Integrated Circuit Serial Programmer (ICSP) module (Programmer) 56 that loads configuration and programming information into controller 6, as described previously herein. Data transmission over infrared link 20 may also be performed as described previously.

Energy conversion efficiency for the instant embodiment is greater than the tag configured with the booster converter circuit (FIG. 3A). The high-efficiency piezoelectric transducer drive circuit may operate with fewer components compared with the boost converter circuit. Fewer components decreases the energy required to power the tag, which permits yet smaller acoustic tags to be constructed for even smaller hosts and applications. In addition, the high-efficiency circuit can reduce the energy required to transmit the acoustic signal, which improves energy efficiency of the tag. In some embodiments, energy expenditure may be below about 35 uJ at an acoustic signal intensity of about 155 dB to about 156 dB. The high-efficiency circuit increases the service lifetime of the acoustic tag by up to 3 times or longer compared with the booster circuit design. Tag lifetimes may be at least about 90 days at a transmission (ping) rate of 3 seconds at an acoustic signal intensity of about 155 dB to about 156 dB.

Figure 3F:
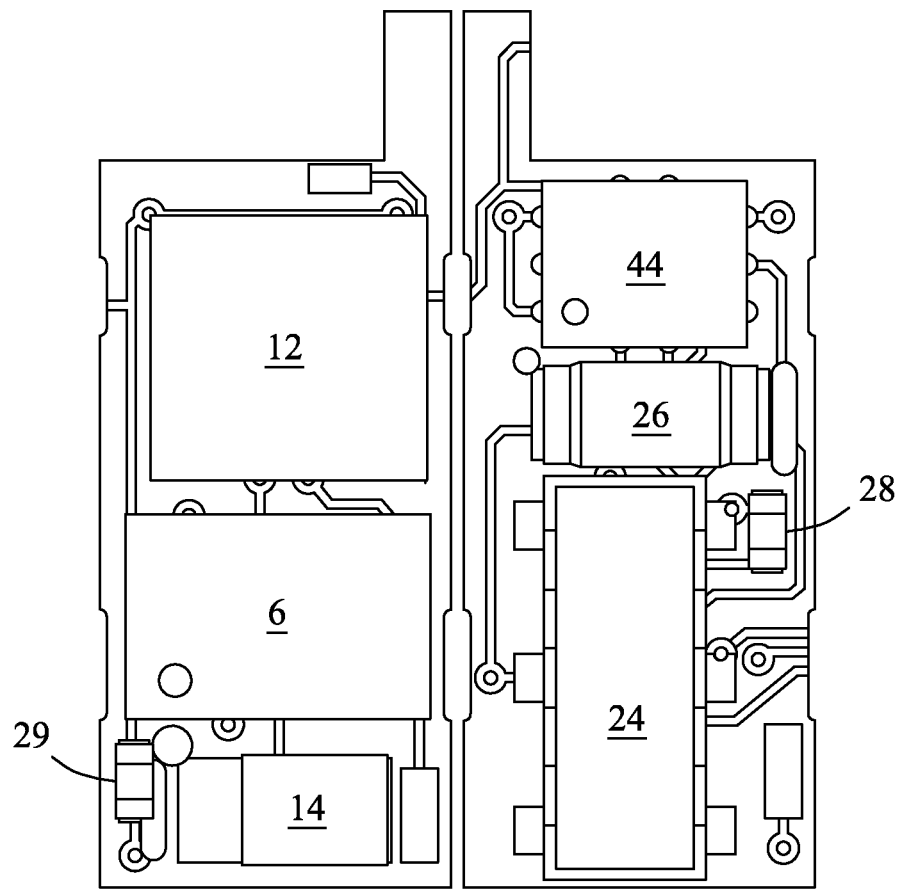

FIG. 3F illustrates an exemplary circuit board design configured with representative components of the acoustic tag described previously in reference to FIG. 3D.

Figure 4:
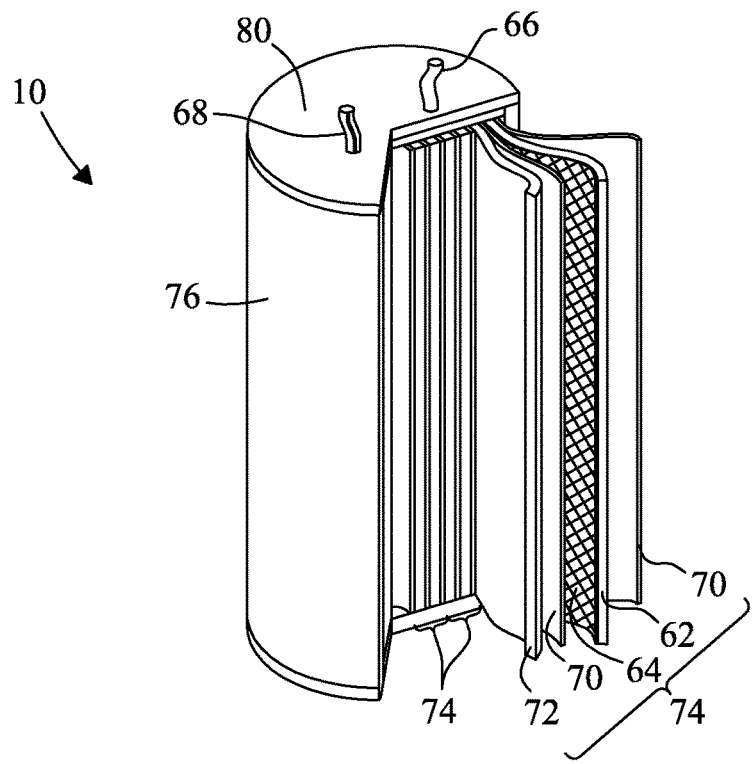
FIG. 4 is a cross-sectional view of a power source of the present invention.

FIG. 4 shows a cross-sectional view of the custom power source (battery) 10 (termed MB306 hereafter) that supplies power to acoustic transmitter (tag) (FIGS. 1a-1c) and electrical components of the present invention. Battery 10 may include a cathode 62 that includes a composite of carbon monofluoride as an active cathode material mixed with a conductive carbon in a binder such as polytetrafluoroethylene (PTFE) to form a free-standing electrode. In an exemplary embodiment, composite cathode 62 may include 85 wt % active cathode material, 10 wt % conductive carbon (e.g., SUPER-P® conductive carbon, Timcal Ltd., Bodio, Switzerland), and 5 wt % PTFE. The composite cathode material when dried may be introduced (e.g., pressed) onto a current collector support 64 constructed of aluminum (or other metal) mesh to form the composite cathode electrode 62. Current collector 64 provides electron transfer between respective cathode 62 and anode 72 electrodes in battery 10. A metal lead 66 [e.g., positive (+) lead] constructed, e.g., of enameled copper wire (e.g., 0.13 mm O.D.)] which may be soldered to current collector 64. Composite cathode 62 (with or without a copper wire lead 66) may be divided into sections with selected dimensions. Individual cathode sections 62 may be introduced between two layers of a separator 70 material composed, e.g., of a micro-porous polypropylene (e.g., Separator 2500, Celgard LLC, Charlotte, N.C., USA) that electrically isolates cathode 62 from anode 72 in individual cathode/anode laminates (couples) 74. Anode 72 may include or be composed of lithium metal [FMC lithium, Charlotte, N.C., USA] with selected thicknesses. In some embodiments, thickness of the anode 72 may be about 0.15 mm, but is not limited. An anode lead 68 (e.g., 0.13 mm O.D.) may be constructed of, e.g., copper, and coupled to anode 72 by directly pressing lead 68 onto the lithium metal.

Multiple individual electrochemical cathode/anode couples (laminates) 74 each comprising a cathode 62 and an anode 72 may be bundled together and introduced into a container 76. In various embodiments, laminates 74 may include a thickness between about 0.21 mm and about 0.24 mm, but dimensions are not intended to be limited. Container 76 may be of a generally cylindrical shape and constructed of a high strength material such as a fluoropolymer, e.g., ethylene tetrafluorethylene (ETFE) sold commercially under the tradename TEFZEL® (DuPont, Wilmington, Del. USA) or aluminum. The polymer includes a high melting temperature, a high flow rate, and excellent chemical and electrical resistance properties. With laminates 74 introduced into container 76, container 76 may be filled with an electrolyte 78 (up to 35 mg on average) to minimize time delays characteristic of conventional CF electrochemical cells. In various embodiments, electrolyte 78 may include or be composed of, e.g., 1M lithium hexafluorophosphate ($LiPF_6$) that is disbursed in a 1:1 volume ratio [EC:DMC] of ethylene carbonate (EC) in dimethyl carbonate (DMC). Container 76 may then be capped with a polymer lid 80 after inserting wire leads 66 and 68 through holes (not shown) introduced in lid 80. Battery 10 when assembled may be sealed, e.g., with an epoxy or other thermosetting polymer. TABLE 1 shows physical properties of a custom power source (MB306) of the present invention compared against conventional (SR416) silver oxide (Qty=2 stacked) batteries.

TABLE 1 compares physical properties of a custom battery (MB306) of the present invention compared with conventional silver oxide (SR416) batteries.

| Battery | Outer Diameter (mm) | Length (mm) | Volume ($mm^3$) | Package Container Weight (mg) | Wall Thickness (mm) | Total Weight (mg) |
|---|---|---|---|---|---|---|
| MB306 | 3.0 | 6.0 | 42 | 17 | 0.15 | 75 |
| SR416 (Qty 2) | 4.8 | 3.2 | 58 | n/a | n/a | 260 |

As shown in the table, battery 10 may have an outer diameter of 3.0 mm and a length of 6.0 mm (tolerance±0.2 mm). Thickness of the wall of battery 10 capsule wall and lid is about 0.15 mm, but is not limited. The battery has a low mass [approximately 0.075 g (±0.02 g)] and a low volume [approximately 0.042 $cm^3$]. Current weight of the battery represents ~71% reduction in the weight burden for tagged animals compared with prior art designs. TABLE 2 compares performance properties of the power source of the present invention against commercial silver oxide batteries.

TABLE 2 lists typical operating and performance parameters of the power source (battery) of the present invention.

| Open Circuit Voltage (OCV) (Volts) | Impedance (@1 kHz) @ OCV ($\Omega$) | Impedance (@1 kHz) @ CCV (4.3 k$\Omega$ lead) ($\Omega$) | Total Capacity (Cut-off @1.5 V) (mAh) | Energy Density Wh/kg | Energy Density Wh/L |
|---|---|---|---|---|---|
| 2.85-3.25 | ≤200 | 6-10 | ~7.3 | 231 | 408 |

Figure 5:
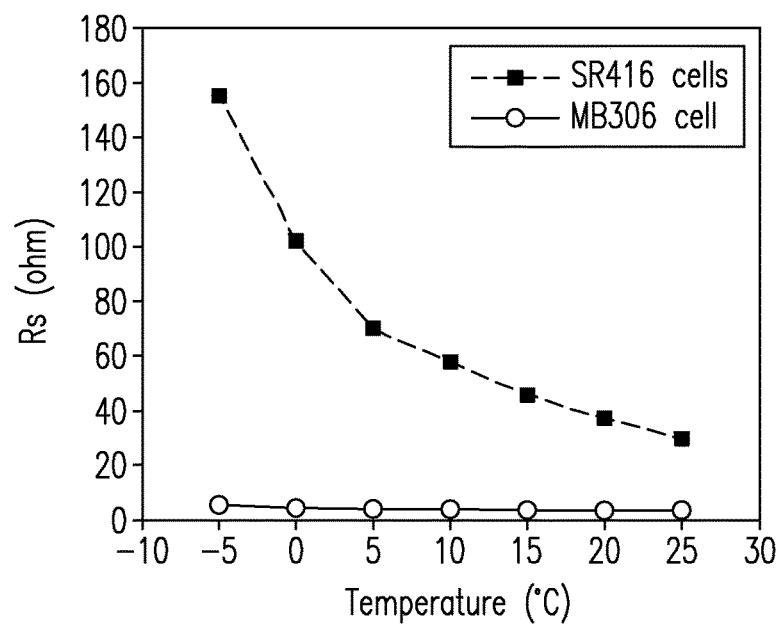
FIG. 5 compares resistances for the power source of the present invention against a conventional power source.

Battery 10 may include a discharge rate at room temperature (e.g., 23° C.) of about 86 mA/g (1 mA/$cm^2$). Cut-off voltage may be about 1.5 V. Battery 10 may also deliver a gravimetric energy density of 231 Wh/kg (volume energy density of 408 Wh/L), an enhancement of greater than 133% over conventional SR416 batteries. In operation, battery 10 may also deliver a stable output voltage of at least 2.85 volts and stable pulse current over a wide temperature range from 0° C. to 25° C. This output voltage is nearly 1V higher than commercial silver oxide (e.g., SR416) batteries, which removes the need to stack batteries as in prior JSATS transmitters or the need for extra electronics to achieve a 3V output. Battery 10 may also have an intrinsically lower impedance compared with silver oxide cells used in prior art JSATS transmitters. FIG. 5 compares the impedance of the battery of the present invention against conventional silver oxide cells. Data show the performance of the battery of the present invention is superior to silver oxide cells over a wide temperature range from about −5° C. to about 25° C. and beyond. Battery 10 may provide a long service lifetime and steady voltage performance for the active acoustic transmission device compared to conventional transmitters known in the art that employ silver oxide cells. Lifetimes of the power source 10 are selectable based on the selection of pulse (transmission) rate intervals (PRIs). Pulse (transmission) rate intervals are not limited.

Tag Lifetimes

TABLE 3 lists exemplary experimental results showing lifetimes for acoustic tags of the present invention.

TABLE 3 lists experimental results showing lifetimes of acoustic tags of the present invention.

| Pulse Rate | TAG LIFE (Days) | |
|---|---|---|
| | Boost Converter Circuit | Shielded Inductor Circuit |
| 0.5 | * | 21.7 |
| 3.0 | * | >90.4 |
| 4.2 | 27.7 | * |

* not determined.

In some embodiments, the acoustic device configured with the boost converter circuit may deliver an acoustic signal above at a transmission rate above 3 seconds over an active lifetime of about 20 days. In some embodiments, the acoustic transmission device may deliver an acoustic signal at a transmission rate of 5 seconds over an active lifetime of at least 30 days. Longer tag lifetimes may be selected: 7 seconds: 40 days; and 10 seconds: 60 days.

In some embodiments, the acoustic transmission device configured with the high-efficiency inductor and dual analog switch may provide an acoustic signal at a transmission rate of 3 seconds over an active lifetime of about 90 days or longer. At a transmission rate of 5 seconds or more, lifetime may be about 150 days or longer. However, no limitations are intended.

Figure 6A:
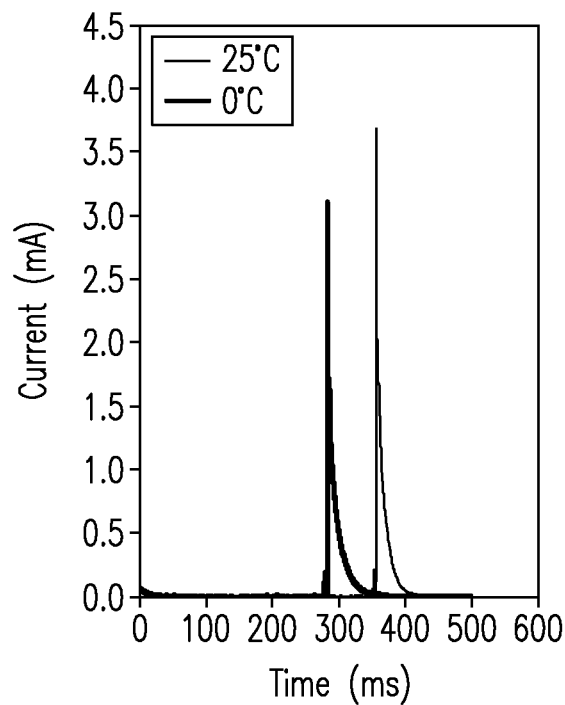
FIGS. 6A-6B compare transmitter pulse current for the power source of the present invention against a conventional power source.
Figure 6B:
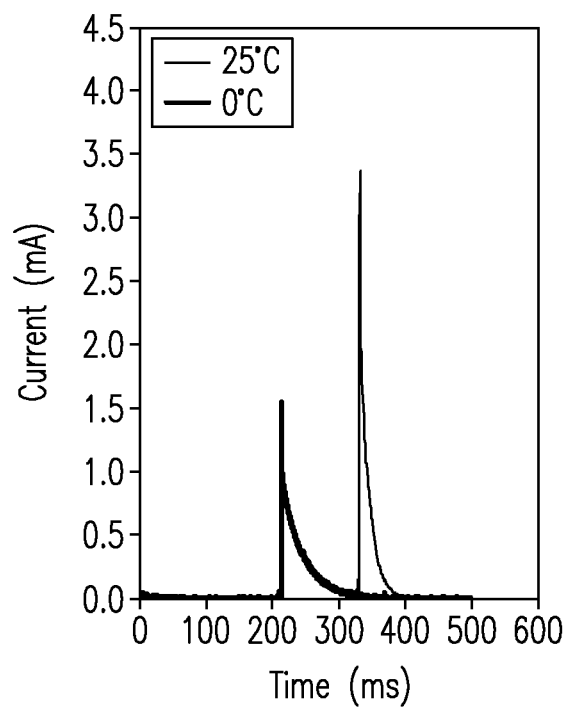

FIGS. 6A and 6B compare pulse currents (mA) generated by the power source of the present invention (i.e., MB306 battery) at 25° C. and 0° C. against conventional silver oxide batteries. Results show the battery pulse currents exhibit greater amplitudes that are delivered more rapidly compared to those obtained with silver oxide cells.

Figure 7:
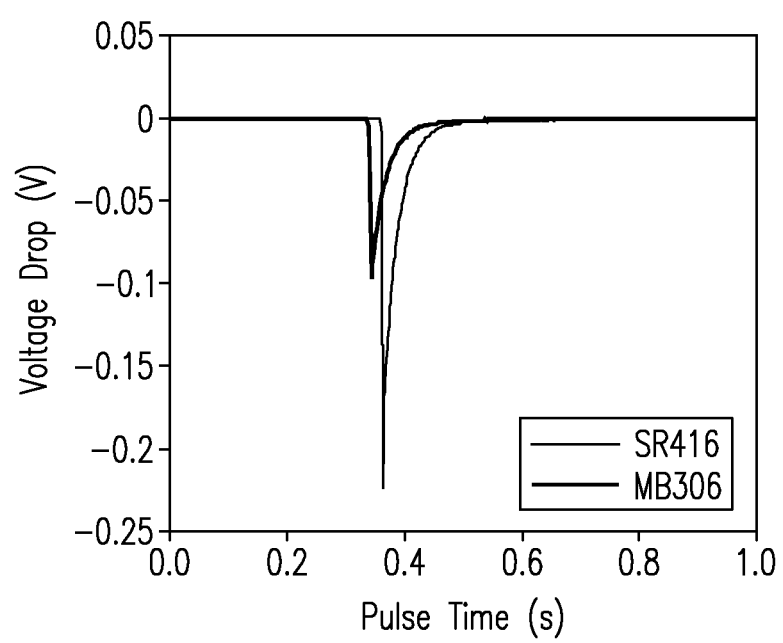
FIG. 7 compares voltage drop for the power source of the present invention against a conventional power source during a pulse transmission.

FIG. 7 compares cell voltages for the power source of the present invention (MB306) against conventional silver oxide cells during a pulse transmission at 0° C. Data show that voltage drops for the silver oxide cells are about a factor of two greater at low temperatures compared with the MB306 battery. When in an inactivated state, the injectable acoustic tag of the present invention maintains a battery capacity of greater than 85% for 12 months after assembly when stored at room temperature (23° C.).

Controller Firmware

Source code loaded into the controller (FIG. 3A) memory may be used to control the functionality and operation of the injectable acoustic tag. Source code may be programmed (e.g., using the MPLAB integrated development environment or like software tools) on a host computer in assembly language (e.g., PIC assembly language) or a higher level language (e.g., C programming language). The software tools on the host computer create the firmware, e.g., in binary or derivative code (e.g., hexadecimal or hex) that can be programmed into the controller on the circuit board (FIG. 1). Source code may be divided into various exemplary modules including, but not limited to: main: specifies configuration bits, declares variables, and executes initial instructions after the controller is reset; initialize: clears all working variables; calibrate: calibrates timers (e.g., the watchdog timer) used to set the transmission frequency; waiting: periodically checks the infrared sensor until the tag is configured; storage: keeps the infrared sensor active until the tag is configured. hibernate: waits for a specified amount of time (e.g., 30 days) before starting acoustic transmission; running: waits for a specified period (e.g., 3 seconds) between acoustic transmissions; transmit: activates the boost converter circuit (FIG. 3a) and the drive circuit (FIG. 3a) to generate the desired acoustic signal on the piezoelectric transducer (FIG. 1); program: reads configuration data from the infrared link and sets the operating mode and other parameters; debug: contains code for development purposes; and tables: contains lookup tables for performing arithmetic operations required to compute temperatures or other sensor data. Controller firmware may contain one or more parameters that control the functionality and operation of the tag. These parameters may be initialized to default values when the microcontroller powers up for the first time, and later configured to new values via the infrared link. TABLE 4 lists exemplary parameters that may be stored in the controller memory to control operation of the injectable acoustic transmission devices (tags).

TABLE 4 lists exemplary parameters in controller memory, with associated memory requirements, for operation of injectable acoustic transmission devices (tags).

| NAME | BYTES | DESCRIPTION |
|---|---|---|
| NextState | 1 | Specifies the operating mode of the controller. The state contains a series of bits whose functions are explained in the source code. Common values are as follows:<br>04 hex: place controller in waiting mode<br>08 hex: place controller in storage mode<br>11 hex: calibrate, then hibernate, then transmit<br>21 hex: calibrate, then transmit |
| RunInterval | 2 | Pulse rate interval in units of 6.5536 ms. The least significant byte is first. For short pulse rate intervals, the value may be decreased to compensate for delays in the controller. |
| HibeTotal | 2 | Hibernate duration in units of 1.9089 hr. The least significant byte is first. |

TABLE 4-continued lists exemplary parameters in controller memory, with associated memory requirements, for operation of injectable acoustic transmission devices (tags).

| NAME | BYTES | DESCRIPTION |
|---|---|---|
| ChrgTable | 6 | A table of charge durations vs. battery voltage in units of 204.8 µs. A first value specifies charge duration of the boost converter for a lowest range of battery voltages. A second value may specify charge duration for a second lowest range of battery voltages, etc. Higher values result in a higher source level but also increase energy consumption. The relationship may be characterized empirically. |
| CalInterval | 2 | Number of transmissions between calibrations. Controller may calibrate timers to ensure that pulse rate interval remains accurate. The same parameter value may be used in hibernate mode to specify number of 256-second intervals between calibrations. The least significant byte may be first. |
| XmitCycles | 1 | Cycles per bit, minus two. The value should be 8 for backward compatibility. |
| XmitInsert | 1 | Index to insert temperature and CRC (check code) in tag code B, or "0" if no insertion is performed. Temperature may use 5 bits and CRC may use 8 bits. |
| XmitState | 1 | Parameter may be "0" when changing XmitCode values. |
| XmitCode | 64 | Table of transmit codes. Each value specifies one bit of tag code A, and one bit of tag code B, as listed below, where bit 0 is the least significant bit: bit 0: transmit bit for code A bit 1: contains 1 at the last bit position for code A bit 4: transmit bit for code B bit 5: contains 1 at the last bit position for code B |
| CRC Table | 32 | Table of CRC codes that correspond to various temperatures. |

Sensor Data

Controller (FIG. 3A) may contain an internal temperature sensor. The controller may embed a 5-bit temperature value (or other sensor value of possibly different length) within one or more tag codes that are transmitted by the piezoelectric transducer to the receiver. Due to the manner in which the controller compensates for variations in the battery voltage, the temperature sensor output may output a numeric value from 0 to 31 that varies with temperature but is not an actual temperature in degrees Celsius. Calibration for each tag may be performed off-board to determine the relationship between numeric values and actual temperatures, e.g., by recording numeric values at several different temperatures. Controller source code may perform the required on-board arithmetic to remove effects of the battery voltage on the temperature data. This procedure may be run, e.g., from the running module described previously herein. To enhance performance, the source code may implement several arithmetic operations as table lookups, but is not limited thereto.

Transmission Detection Range

Acoustic signals transmitted by tags of the present invention may include a detection range of up to about 1 km (3,280 ft) in fresh water. However, no limitations are intended. For example, in locations with a relatively large amount of background noise, such as immediately downstream of a dam spillway, signals may be transmitted about 100 meters. In other locations with a relatively small amount of background noise, such as the middle of a lake, signals may be transmitted up to about 500 meters. However, distances are not intended to be limited. Tag signals can be encoded for maximum strength to improve range and resolution.

Beam Transmission Patterns

Figure 8:
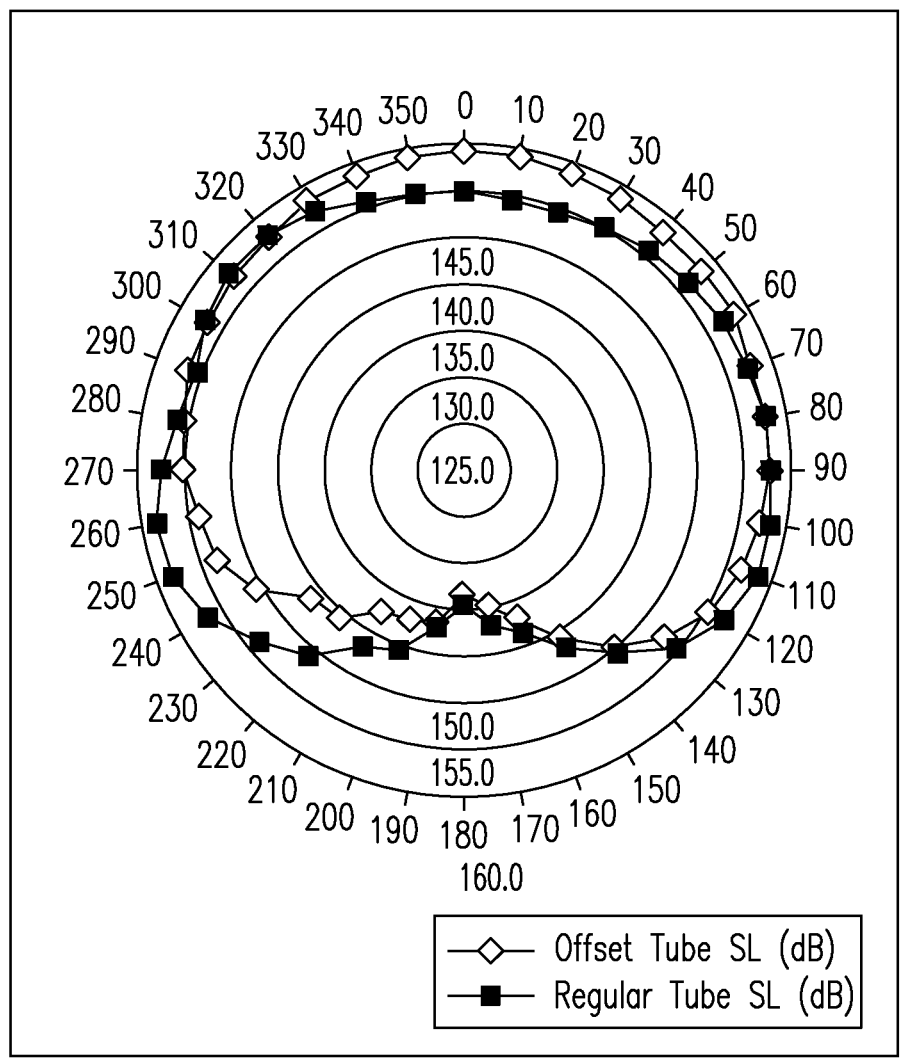
FIG. 8 compares beam patterns for an offset (non-concentric) piezoelectric transducer of the present invention against a conventional (concentric) piezoelectric transducer.

FIG. 8 compares beam patterns for an IC-offset (non-concentric) piezoelectric tube transducer (e.g., a model #610HD PZT tube transducer, TRS Technologies Inc., State College, Pa., USA) used in concert with the present invention against a conventional (concentric) piezoelectric transducer. In the test configuration, the inner circumference of the IC-offset piezoelectric tube transducer was offset from the tube center by 0.15 mm. Results show acoustic energy (source level output) delivered to the front 180° (i.e., from 0° to 90° and from 270° to 0°) of the injectable tag is enhanced. Acoustic energy (source level output) delivered from the front of the piezoelectric tube transducer provides a beam pattern that is preferably omnidirectional at least over the front 180° of the wavefront. Acoustic energy delivered to the rear 180° (i.e., from 90° to 270°) is reduced. The IC-offset can be tailored to enhance the acoustic signal emitted towards the front of the tag up to the mechanical limits of the piezoelectric material. Beam pattern may also be affected by the shape of the epoxy coating on the piezoelectric transducer, dimensions of electronic components positioned behind the piezoelectric transducer, and the gap or spacing behind or between the piezoelectric transducer and other electronic components. Tests show that electronic components positioned behind the piezoelectric transducer with a height dimension greater than 1 mm can generate a beam pattern with acoustic outputs that are lower on two or more sides of the tag. Thus, to achieve an omnidirectional beam pattern, the epoxy coating on the tube piezoelectric transducer should be thin (<0.2 mm). The coating should also conform to the outer surface of piezoelectric transducer to minimize irregularities in the coating which can cause fluctuations in the source level leading to non-uniform beam patterns. Wavefront effects stemming from interactions between emitted and reflected acoustic waves can be minimized by inserting a reflector behind the piezoelectric transducer as described herein.

Figure 9:
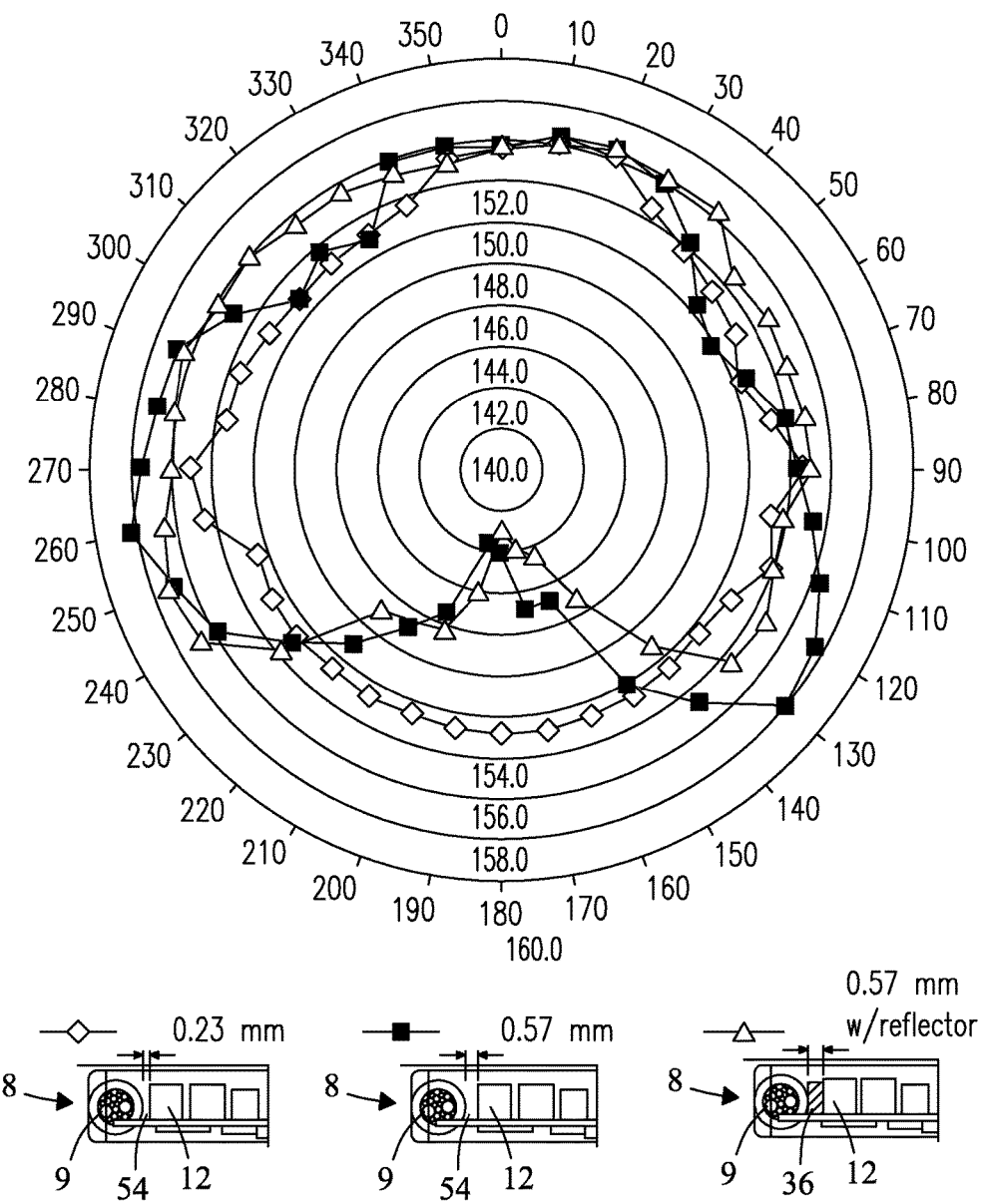
FIG. 9 compares beam patterns of acoustic tags of the present invention as a function of gap spacing of the piezoelectric transducers.

FIG. 9 shows exemplary beam patterns for injectable acoustic tags of the present invention. A separation gap 54 positioned directly behind the piezoelectric transducer and a (e.g., 1.6 mm tall) inductor (FIG. 1A) may include various selected width or spacing dimensions (e.g., 0.23 mm and 0.57 mm). In some embodiments, the tag may be equipped with an acoustic reflector 36 composed of, e.g., EPDM closed-cell foam which may be placed within gap 54 to improve the beam pattern of the tag. In exemplary embodiments, tags equipped with an acoustic reflector 36 placed within the gap 54 show a beam pattern with a 180° wavefront (i.e., from 0° to 90° and from 270° to 0°) that becomes more uniform as the gap spacing between the piezoelectric transducer and inductor 12 (or another component) increases. Results may be attributed to reflection of acoustic waves by the acoustic reflector from adjacent electronic components back towards the piezoelectric transducer. The reflector also dampens acoustic waves within gap 54. Tests show acoustic energy emitted from the back of the piezoelectric transducer (i.e., facing the circuit board) is less likely to be detected because of the location of hydrophones relative to the piezoelectric transducer. Redirection of acoustic energy by the acoustic reflector to the front end of the piezoelectric transducer enhances the detection probability.

Encapsulation of Tag Components

Figure 10:
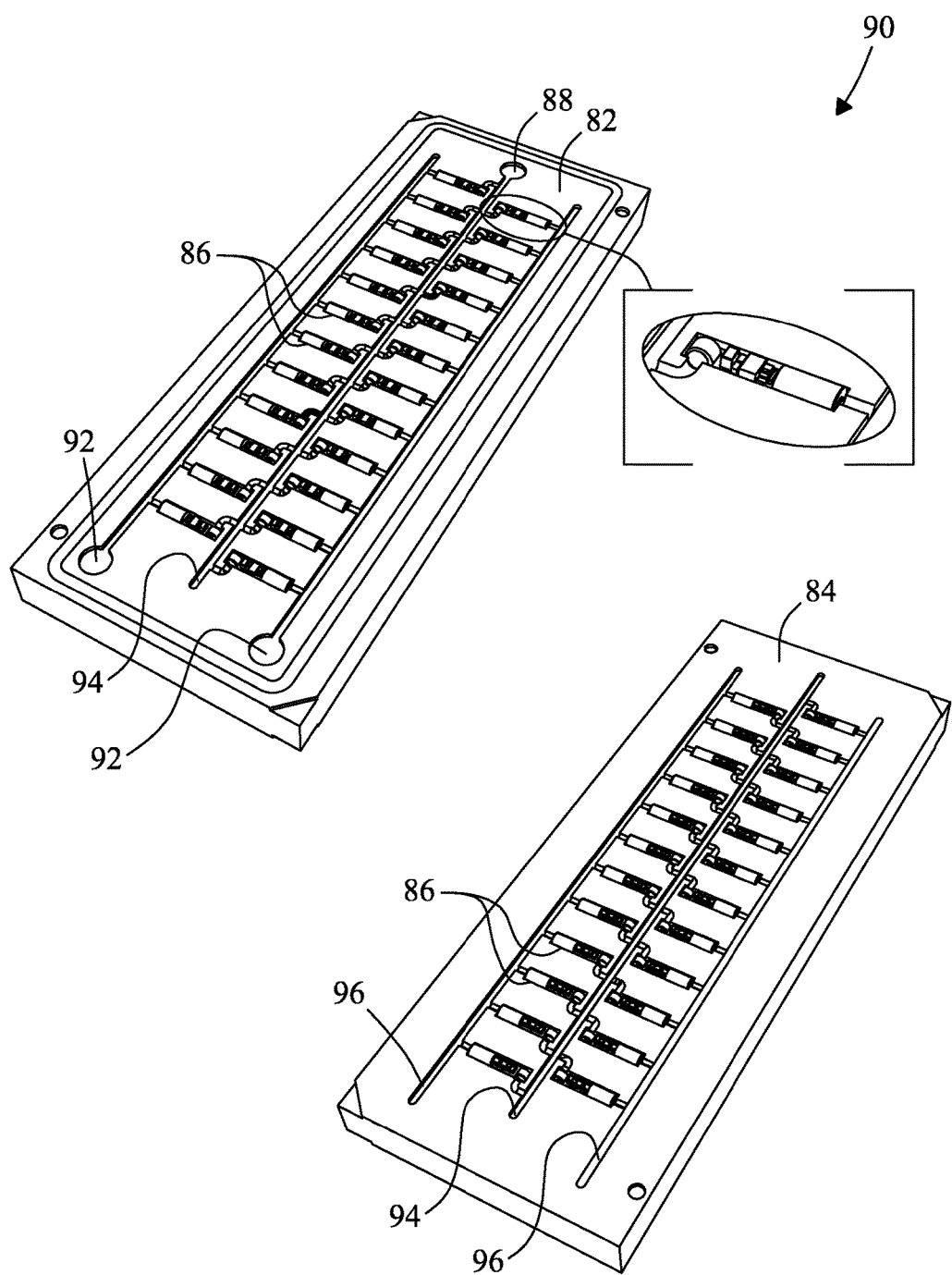
FIG. 10 shows a mold for encapsulating acoustic tags of the present invention.

FIG. 10 shows an exemplary tag mold 90 for encapsulating assembled acoustic tags. Tag mold 90 may include a top portion 82 and a bottom portion 84 constructed, e.g., of an unfilled polyetherimide plastic (e.g., ULTEM® Resin 1000, Saudi Basic Industries Corp., Riyadh, Saudi Arabia) with cavities 86 in respective half portions that are mirror images of the other into which assembled tags may be positioned. In the exemplary embodiment, mold 90 may include an at least one inlet 88 and two outlets 92. Epoxy resin may be flowed through mold 90 using a process such as a vacuum forming process or an injection forming process. A releasing agent (e.g., DC20, Dow Corning, Midland, Mich., USA) at a dilute concentration of about 1 part of DC20 in 5 parts Xylene) may be applied to the surface of the cavities 86 of tag mold 90 to allow easy release of encapsulated tags after the epoxy has cured. In some embodiments, a vacuum forming process may be used. Vacuum may be pulled from the outlets 92 of mold 90 to create a pressure differential that allows the epoxy to flow. Flow of epoxy may be "guided" by vacuum through all the cavities 86. Mold 90 is sealed to prevent air pockets from being introduced into the coating surrounding components of the tag. Mold 90 may be configured such that epoxy flows into each cavity 86 from the piezoelectric transducer end (see FIG. 1A) of the tag and flows out of the mold 90 at the battery end (see FIG. 1A) of the tag to allow the piezoelectric transducer and the electronics to be fully covered. Flow around the microbattery, the largest component, can represent the greatest resistance to flow of epoxy and hence the largest pressure drop. An O-ring (ID=146 mm) may be employed in the mold to provide sealing. Epoxy entry ducts 94 for individual cavities 86 may be placed on either of two flat opening ends of the piezoelectric tube transducer (not directly on the curved surface of the piezoelectric transducer) to prevent introducing uneven surfaces in the piezoelectric transducer coating of the finished tag that can lower the source level of the acoustic signal.

In some applications, injection forming may be used. Epoxy may be mechanically pushed through the mold 90 with, e.g., a syringe pump (not shown). Epoxy may be introduced through the inlet 88, through all cavities 86 of the mold 90, and out of the mold 90 through outlets 92 after passing through the cavities 86 on each either side of the mold 90. Air may be pushed out of the mold 90 by flowing epoxy, which also prevents air from being introduced back into mold 90. Flow may be guided by the mold design. For purposes of uniformity, each cavity 86 of the mold 90 is preferably filled with either tag components to be encapsulated or a filler such as modeling clay for empty cavities. Filling empty cavities prevents epoxy resin from flowing preferentially into the empty cavities and promoting formation of air pockets in tags positioned in other cavities. Optimal rates for infusion of epoxy resin depends in part on the type of epoxy employed. Resins suitable for use include thermosetting epoxies such as, e.g., EPO-TEK 301 or Electrical Resin 5. Both epoxies can be used to encapsulate the tag with a selection of a suitable injection rate. A minimum injection rate of about 10 mL/min provides a flow that effectively encapsulates the tag components. Setting mold 90 in a vertical position can also assist with removal of air pockets inside the mold.

Coding and Activation

Injectable tags may be programmed with one or more tag codes of a selectable code length. Each tag code may be configured with a same or a different tag identification (ID) code. Each ID code may include an (n)-bit tag ID length. In exemplary embodiments described herein, each of the one or more tag codes has a length of 31 binary bits, and is comprised of a 7-bit (i.e., length) "Barker" code, a 16-bit tag ID code, and an 8-bit cyclic redundancy check (CRC). The CRC is an error-detection code transmitted as a portion of the tag code commonly used to detect changes to raw data. Transmitted data may be appended with a short CRC (i.e., data verification) value of a fixed (e.g., a 3-bit up to 8-bit) length. When data is retrieved, the CRC calculation may be repeated to ensure data is not corrupted. Format of the one or more tag codes is configurable. The configurable format allows each tag to have various and different user-defined encoding configurations suitable for various applications. For example, number and length of the tag codes are configurable. In various embodiments, injectable acoustic tags of the present invention may each include one or more tag codes each with a selectable code length of up to 64 bits. In some embodiments, the controller may alternate between the two tag codes, a first code in a first cycle and a second code in a second cycle, each with their respective ID codes. Alternating between two tag codes increases the number of possible unique binary tag identifications (IDs) while maintaining backward compatibility with existing receiver equipment. If each tag code contains a 16-bit tag ID code, two tag codes provide a total of $2^{16}$ times $2^{16}$, or over 4 billion unique Ids. Tags of the present invention may also transmit similar or the same codes in every cycle so as to be backward compatible with existing JSATS tags. For example, in applications where a single tag ID code is desired, both may be coded to the same value. Other numbers of tag codes may be employed without limitation. Tags may be configured and activated with all required operating parameters by connecting the infra-red programmer (FIG. 3B) to the serial port on a computer (not shown), positioning an IR LED on the IR programmer within a distance of 1 cm from the tag phototransistor (FIG. 3B) and powering the IR programmer. The programming script on the host computer may be run, which sends commands serially to the IR programmer through the serial port to the controller which configures the tag. Programming times are about 10 seconds or less on average. The LED on the IR programmer may turn "off" when the configuration is complete. Tags may be placed in storage mode and stored in a dark box until being readied for injection. When used, the tag may be reconfigured to place the microcontroller in transmit or hibernate mode.

Tag codes of the present invention can also transmit data from various sensors included in the tag. In various embodiments, e.g., the microcontroller or the tag may contain an internal temperature sensor or other sensors. In some embodiments, the microcontroller may contain an internal temperature sensor. In some embodiments, partial codes can be used to embed temperature and/or other sensor measurements into the transmission codes. For example, when a temperature sensor is used, temperature data may be collected in the host animal and encoded as a partial component (e.g., as a 5-bit temperature value) which may be incorporated as a component of a full (e.g., second) tag code, which may then be encoded and transmitted from the tag in the acoustic signal to the receiver. As an example, when encoding a temperature measurement, a first primary code may include, e.g., a 7-bit barker code, a 16-bit ID code (with a unique ID), and an 8-bit CRC. The primary code may be followed by a secondary code containing a partial ID code with the temperature data, e.g., a 7-bit "barker" code, an 11-bit secondary tag ID, a 5-bit temperature code, and an 8-bit CRC.

In some embodiments, the temperature sensor may provide an analog output [e.g., a numeric value from 0 to 31 (not the actual temperature in ° C.) that increases with temperature] that depends on the battery voltage. In such applications, the microcontroller may measure both the temperature value and the battery voltage simultaneously and then perform on-board arithmetic to compensate for any offsets between measured and actual temperature values and the battery voltage. Because CRCs can change as a result of updated temperature bits, the microcontroller may be configured to specify 32 CRC codes, each 8 bits long, for use with the temperature feature. The tag can transmit the appropriate CRC code at the end of the transmission of the ID code.

Attachment of Acoustic Tags

Acoustic tags of the present invention may be attached to hosts in various ways. In some embodiments, the acoustic tag may be an injectable acoustic tag configured with dimensions that allow it to be injected into a host animal. Injection can minimize the time required to tag individual animals or minimize negative biological effects associated with surgical implantation in a host animal. In some embodiments, the injectable acoustic tag may be injected into the host through an 8-gauge syringe needle. In some applications, the syringe that injects the tag may include a plunger that is spring loaded to inject the tags. In some applications, gases may be used inject the tags be employed to inject the acoustic tags. Preferred sites for injection of injectable tags in the host are not limited. In fish, for example, injection of the injectable tag may be made at a point where the tip of the pectoral fin lies against the body, e.g., about 2 mm to 3 mm dorsal to the linea alba, a fibrous connective tissue that runs down the midline of the abdomen that does not contain primary nerves or blood vessels. However, injection sites are not intended to be limited. In some applications, acoustic tags may be attached, e.g., to the clothing of a human host, to an inanimate object, or to a self-propelled object such as a robot. Methods for attachment of the acoustic tags are not limited.

While the invention has been described with what is presently considered to be the most practical and preferred embodiments, many changes, modifications, and equivalent arrangements may be made without departing from the invention in its true scope and broader aspects. Thus, the scope is expected to be accorded the broadest interpretation relative to the appended claims. The appended claims are therefore intended to cover all such changes, modifications, equivalent structures, and products as fall within the scope of the invention. No limitations are intended.

What is claimed is:

1. An acoustic transmission device for identifying and tracking a selected host, the device comprising:
   a containment vessel that defines an internal volume below about 115 mm3 with selected dimensions for containing components of the device in a selected configuration;
   a power source configured to power operation of the device;
   a controller configured to supply one or more tag codes, each tag code having a selectable code length and an identification code of a selectable bit length therein;
   at least one piezoelectric transducer disposed in the containment vessel; and
   a piezoelectric transducer drive circuit that delivers a selected drive voltage to the at least one piezoelectric transducer that generates the acoustic transmission signal including the encoded tag codes and respective identification codes therein, the at least one piezoelectric transducer is configured to transmit the acoustic transmission signal at a selected transmission rate at a selected acoustic signal intensity to a receiver disposed external to the acoustic transmission device.

2. The device of claim 1, wherein the containment vessel has dimensions and a configuration that allows the device to be introduced into the host with a syringe needle.

3. The device of claim 1, wherein the containment vessel has a length at or below about 15.0 mm and a diameter at or below about 3.4 mm.

4. The device of claim 1, wherein the piezoelectric transducer drive circuit comprises a boost converter circuit that up converts the voltage delivered from the power source to the at least one piezoelectric transducer.

5. The device of claim 4, wherein the power source powers the device for a lifetime of at least about 20 days at a transmission (ping) rate of 3 seconds at an acoustic signal intensity of about 155 dB to about 156 dB.

6. The device of claim 1, wherein the piezoelectric transducer drive circuit comprises a dual analog switch and a high-efficiency inductor configured to deliver a drive voltage to the at least one piezoelectric transducer.

7. The device of claim 6, wherein the device includes a power source configured to power the device for a lifetime of at least about 90 days at a transmission (ping) rate of about 3 seconds at an acoustic signal intensity of at least about 156 dB.

8. The acoustic device of claim 6, wherein the at least one piezoelectric transducer expends an energy per transmission at or below about 35 uJ at an acoustic signal intensity of about 155 dB to about 156 dB.

9. The device of claim 1, wherein at least one of the at least one piezoelectric transducer includes an outer wall with an outer circumference and an inner wall with an inner circumference, each wall includes a surface electrode, the inner circumference includes a center that is offset from the center of the outer circumference by a distance selected to enhance the acoustic transmission signal in at least a forward transmission direction.

10. The device of claim 1, wherein the at least one piezoelectric transducer includes end caps composed of a selected metal disposed at respective ends of the at least one piezoelectric transducer configured to enhance the acoustic transmission signal emitted from the ends thereof.

11. The device of claim 1, further including an acoustic reflector positioned behind the at least one piezoelectric transducer that enhances the acoustic signal intensity by at least about 0.5 dB in at least a forward direction compared with the device absent the acoustic reflector.

12. The device of claim 11, wherein the acoustic reflector comprises a closed cell foam that enhances the acoustic signal emitted from the at least one piezoelectric transducer in at least a forward direction.

13. The device of claim 11, wherein the acoustic reflector yields an acoustic transmission signal from the at least one transducer with a substantially uniform beam pattern comprising 180° of the transmission wavefront in at least a forward direction.

14. The device of claim 1, wherein the device has a dry weight less than about 220 mg.

15. The device of claim 1, wherein the power source is a lithium/carbon fluoride battery configured to supply an output voltage of at least about 2.5 volts.

16. The device of claim 15, wherein the power source includes a plurality of laminates each laminate includes an anode and a cathode disposed between a polymer separator that electrically isolates the cathode from the anode in the laminate and an electrolyte.

17. The device of claim 1, wherein the controller is configured to automatically adjust the energy drawn from the power source as the power source discharges such that the acoustic source level remains substantially constant over the operation lifetime of the device.

18. The device of claim 1, wherein the at least one piezoelectric transducer is configured to deliver the acoustic transmission signal at an acoustic signal intensity of about 155 dB to about 156 dB.

19. A method for identifying and tracking a selected host, the method comprising:
attaching the acoustic transmission device of claim 1 to the selected host at a selected location;
transmitting an acoustic signal at a selected acoustic intensity from at least one piezoelectric transducer of the acoustic transmission device at a selected frequency over a selected distance to a receiver disposed external to the host, the acoustic signal encoded with one or more tag codes of a selected code length containing at least location data and identification data of the host therein; and
decoding the acoustic signal received from the acoustic transmission device to identify and track the host in up to three dimensions in real-time or as a function of time.

20. The method of claim 19, wherein attaching the acoustic transmission device includes injecting the device into the host.

21. The method of claim 20, wherein injecting the acoustic transmission device includes injecting the device through a syringe needle.

22. The method of claim 19, wherein the transmitting includes transmitting the acoustic signal from the at least one piezoelectric transducer over an operation lifetime of at least about 20 days at a transmission rate of 3 seconds.

23. The method of claim 19, wherein the transmitting includes transmitting the acoustic signal from the at least one piezoelectric transducer over an operation lifetime of at least about 90 days at a transmission rate of 3 seconds.

24. The method of claim 19, wherein transmitting the acoustic signal includes delivering a power source voltage through a booster circuit of the device up converting the voltage to form a drive and delivering the drive voltage to the at least one piezoelectric transducer.

25. The method of claim 19, wherein transmitting the acoustic signal at the selected resonance frequency includes delivering a drive voltage that is above the power source voltage from a resonance induction circuit to the at least one piezoelectric transducer generating the resonance frequency therein.

26. The method of claim 19, wherein the transmitting the acoustic signal includes transmitting sensor data collected from one or more sensors in the acoustic transmission device encoded in at least one of the one or more tag codes transmitted from the acoustic transmission device.

27. The method of claim 19, wherein transmitting the acoustic signal includes transmitting the acoustic signal from the at least one piezoelectric transducer at an acoustic signal intensity of about 155 dB to about 156 dB.

28. The method of claim 19, wherein transmitting the acoustic signal includes automatically adjusting the energy drawn from the power source as the power source discharges such that the acoustic signal intensity remains substantially constant over the operation lifetime of the acoustic transmission device.

29. The method of claim 19, wherein transmitting the acoustic signal includes an energy expenditure of less than or equal to about 35 uJ per transmission.

30. The device of claim 1, further comprising a boost circuit which comprises a first inductor configured to conduct electrical energy to a capacitor, and wherein the piezoelectric transducer drive circuit comprises a second inductor which is coupled with the capacitor and a plurality of electrodes of the at least one piezoelectric transducer.

31. The device of claim 30, wherein the piezoelectric transducer drive circuit comprises a switch coupled with the second inductor, and wherein the controller is configured to control the switch to oscillate the at least one piezoelectric transducer at a desired frequency.

32. The device of claim 31, wherein the controller is configured to apply a square wave having one of a plurality of different duty cycles to control the switch.

33. The device of claim 1, wherein the at least one piezoelectric transducer comprises plural flat ends, and wherein the acoustic transmission device further comprises a plurality of end caps positioned at the flat ends of the at least one piezoelectric transducer to enhance the acoustic transmission signal in at least a forward transmission direction.

34. The device of claim 1, wherein the at least one piezoelectric transducer comprises plural flat ends, and wherein the acoustic transmission device further comprises:
an acoustic reflector positioned behind the at least one piezoelectric transducer;
a plurality of end caps positioned at the flat ends of the at least one piezoelectric transducer; and
wherein the acoustic reflector and the end caps are configured to enhance the acoustic transmission signal in at least a forward transmission direction.

35. The device of claim 34, wherein the reflector and the end caps comprise different materials.

36. The device of claim 1, wherein the acoustic transmission device is associated with a host for tracking the host, and wherein the acoustic transmission device is configured to delay a start of transmission of the acoustic transmission signal for a plurality of days after the association of the acoustic transmission device with the host.

37. The device of claim 1, wherein the containment vessel has an elongated shape having a narrowed dimension at a first end which is adjacent to the at least one piezoelectric transducer compared with a second end which is opposite to the first end.

38. The device of claim 1, wherein the at least one piezoelectric transducer includes an inner wall, and further comprising closed-cell foam bounded to the inner wall to enhance the acoustic transmission signal.

\* \* \* \* \*

UNITED STATES PATENT AND TRADEMARK OFFICE
CERTIFICATE OF CORRECTION

PATENT NO.        : 10,033,470 B2
APPLICATION NO.   : 14/914974
DATED             : July 24, 2018
INVENTOR(S)       : Z. Daniel Deng et al.

Page 1 of 1

It is certified that error appears in the above-identified patent and that said Letters Patent is hereby corrected as shown below:

Page 2, Column 1, (56) References Cited Other Publications. Line 3, - Replace "WO PCT/US2014/053578 Search Rept., dated Mar. 5, 2016, Battelle Memorial Institute." with --WO PCT/US2014/053578 Search Rept., dated Mar. 5, 2015 Battelle Memorial Institute.--

Page 2, Column 1, (56) References Cited Other Publications. Line 5, - Replace "WO PCT/US2014/053578 Writ. Opin., dated Mar. 5, 2016, Battelle Memorial Institute." with --WO PCT/US2014/053578 Writ. Opin., dated Mar. 5, 2015, Battelle Memorial Institute.--

Page 3, Column 1, (56) References Cited Other Publications. Line 38, - Replace "WO 2011/068825, Aug. 9, 2011, Eaglepicher Technologies, LLC." with --WO 2011/068825, June 9, 2011, Eaglepicher Technologies, LLC.--

Signed and Sealed this
Twenty-seventh Day of August, 2019

Andrei Iancu
*Director of the United States Patent and Trademark Office*

UNITED STATES PATENT AND TRADEMARK OFFICE
CERTIFICATE OF CORRECTION

| | |
|---|---|
| PATENT NO. | : 10,033,470 B2 |
| APPLICATION NO. | : 14/914974 |
| DATED | : July 24, 2018 |
| INVENTOR(S) | : Z. Daniel Deng et al. |

It is certified that error appears in the above-identified patent and that said Letters Patent is hereby corrected as shown below:

In the Specification

Column 1, Line 20:
Replace "DE-AC05-76RLO1830"
With --DE-AC05-76RL01830--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*